United States Patent
Hill et al.

(10) Patent No.: US 8,095,335 B2
(45) Date of Patent: Jan. 10, 2012

(54) PROCESS FOR MAPPING OFF-SITE PIPING SYSTEMS IN A REFINERY AND/OR PETROCHEMICAL FACILITY AND A SYSTEM FOR PROVIDING EMERGENCY ISOLATION AND RESPONSE IN A REFINERY AND/OR PETROCHEMICAL FACILITY

(75) Inventors: Susan C Hill, St. Amant, LA (US); Elvis L Calhoun, St. Francisville, LA (US); William M Castro, Baton Rouge, LA (US)

(73) Assignee: ExxonMobil Research & Engineering Company, Annandale, NJ (US)

( * ) Notice: Subject to any disclaimer, the term of this patent is extended or adjusted under 35 U.S.C. 154(b) by 761 days.

(21) Appl. No.: 11/898,284

(22) Filed: Sep. 11, 2007

(65) Prior Publication Data
US 2008/0215256 A1 Sep. 4, 2008

Related U.S. Application Data

(60) Provisional application No. 60/843,397, filed on Sep. 11, 2006.

(51) Int. Cl.
*G01L 19/08* (2006.01)
(52) U.S. Cl. ............ 702/152; 702/5; 702/150; 324/220; 324/207.13
(58) Field of Classification Search .................. 702/152, 702/150, 176, 142, 2, 5; 324/220, 207.13; 73/865.68, 865.08; 707/918–919
See application file for complete search history.

(56) References Cited

U.S. PATENT DOCUMENTS

| 5,414,462 | A | 5/1995 | Veatch |
| 5,689,233 | A | 11/1997 | Kurisu et al. |
| 6,243,657 | B1 * | 6/2001 | Tuck et al. .................. 702/150 |
| 6,564,201 | B1 | 5/2003 | Hamsa |
| 6,624,532 | B1 | 9/2003 | Davidow et al. |
| 6,957,157 | B2 * | 10/2005 | Lander ........................ 702/56 |
| 2002/0113869 | A1 | 8/2002 | Kirkwood |
| 2002/0161940 | A1 | 10/2002 | Eryurek et al. |
| 2004/0254963 | A1 | 12/2004 | Bradley et al. |
| 2005/0038825 | A1 | 2/2005 | Tarabzouni et al. |

(Continued)

FOREIGN PATENT DOCUMENTS
EP 0 989 353 A 3/2000
(Continued)

OTHER PUBLICATIONS

Scomptec Inc., "GIS—Mapping Solution" Article, dated Jun. 5, 2006.

(Continued)

*Primary Examiner* — Drew A Dunn
*Assistant Examiner* — Hien X Vo
(74) *Attorney, Agent, or Firm* — Glenn T. Barrett

(57) ABSTRACT

A process of mapping piping systems associated with a refinery and petrochemical facilities is disclosed, which maps piping systems, which interconnect facility operating units with other operating units, utilities, distribution facilities and storage units. A system for aiding in the isolation of piping systems, operating units and other facility components is also disclosed. The system includes a search database having representations of the piping systems and its related components. A method of isolating an event within a facility is also disclosed. The method includes identifying the location of an event in the facility, performing a search to identify the impacted piping systems and related components, and identifying measures to isolate the event.

13 Claims, 19 Drawing Sheets

U.S. PATENT DOCUMENTS

2005/0086227 A1    4/2005  Sullivan et al.
2007/0288200 A1*  12/2007  Guidi et al. .................. 702/179

FOREIGN PATENT DOCUMENTS

WO        WO 99/32902 A    7/1999

OTHER PUBLICATIONS

Fire Chief, "Point & Click" Article, by Pat West, dated Mar. 1, 2005.

International Search Report, PCT/US2007/019695, mailed Apr. 17, 2008.
Written Opinion, PCT/US2007/019695, mailed Apr. 17, 2008.
Written Opinion, Singapore Appl. No. 200901623-9, Australian Patent Office, dated Dec. 22, 2009, 6 pages.
Search Report, Singapore Appl. No. 200901623-9, Australian Patent Office, dated Dec. 22, 2009, 4 pages.

* cited by examiner

PROCESS FOR MAPPING OFF-SITE PIPING SYSTEMS IN A REFINERY AND/OR PETROCHEMICAL FACILITY AND A SYSTEM FOR PROVIDING EMERGENCY ISOLATION AND RESPONSE IN A REFINERY AND/OR PETROCHEMICAL FACILITY

CROSS REFERENCE TO RELATED APPLICATION

The present invention relates to and claims priority to U.S. Provisional Patent Application No. 60/843,397, filed on Sep. 11, 2006, entitled "A Process for Mapping Off-Site Piping Systems in a Refinery and/or Petrochemical Facility and a System For Providing Emergency Isolation and Response in a Refinery and/or Petrochemical Facility."

BACKGROUND OF THE INVENTION

1. Field of the Invention

The present invention relates to a process of mapping piping systems associated with a refinery and petrochemical facilities. In particular, the present invention relates to a process of mapping piping systems associated with off-site piping systems, which interconnect facility operating units with other operating units, utilities, distribution facilities and storage units. The present invention further relates to a system for aiding in emergency isolation of the operating units and other facility components to limit potential damage to the same and the response time of refinery and/or petrochemical personnel in the event of an incident within a refinery or petrochemical facility. The system also provides an effective management tool for off-site piping systems with regard to inspection, maintenance and planning for facility modifications, maintenance, upgrades and expansions.

2. Discussion of Related Art

Refinery and petrochemical facilities typically occupy large tracts of land, which may extend over hundreds of acres or possibly several square miles. These facilities include multiple operating units including but not limited to hydrocracking units, cokers, cat cracking units, and numerous other processing units. The piping, which interconnects these operating units along with storage units or tanks is commonly called off-site piping. A typical refinery or petrochemical facility may include a plurality of individual off-site piping lines. For example, it is possible that the facility may have in excess of one hundred (100) different off-site piping lines with an excess of 8000 different pipe branches spread over several square miles. These off-site piping lines may represent up to several thousand miles or more of piping. Typically, each off-site piping line contains a distinct substance, which is isolated from other discrete substances until processing in a processing unit. These substances may be flammable, combustible and inherently toxic. The release of these substances due to a leak or a failure of the piping lines or an event in a processing unit may pose a hazard to facility personnel, the environment, the facility in general and the surrounding community. These individual off-site piping lines will often overlap such that the piping travels along similar paths before branching off to the desired facility unit and/or storage facility. Each off-site piping line may include one or more off-site piping branches. The piping lines contain various piping objects including but not limited to pipes (or lines), in-line valves (e.g., regulator valves, shut off valves, diverter valves, etc.), and a variety of other piping objects (fittings, connectors, vents, drains, sensors, clamps etc.). The valves permit the isolation of operating units, the redirection of the distinct substances or fluids to other units or tanks, etc.

The off-site piping line travels along a path called a pipeband. The pipeband includes the piping associated with the off-site piping lines and supporting structures (such as pipeway, sleeperway or pipe rack). A pipeband may include a single off-site piping line or multiple piping lines. For example, a typical vertical cross section of the pipeband (which is referred to as a "cut sheet") may reveal as few as one to five different off-site piping lines or as many as in excess of one hundred fifty (150) different off-site piping lines at multiple levels. It is often difficult to distinguish individual off-site pipe lines. Given the complexity of the facility, the number of different processing or operating units, and the miles of off-site piping, it is often difficult to quickly identify the contents of any one off-site piping line and the operating units to which it is connected.

There are times when it is necessary to isolate operating units, other off-site piping lines, distribution facilities or tanks or prevent the flow of the substances through the off-site piping lines. This may occur during the occurrence of an emergency event (e.g., failure of an operating unit, rupture or failure of a storage tank, rupture of a portion of the off-site piping line, a spill, toxic event, fire and/or explosion). This may also occur during non-emergency situations (e.g., a maintenance project, a capital project associated with modification and/or expansion of existing operating units or the addition of an operating unit, the presence of a crane or other construction equipment, which could destroy or damage a pipeband if the crane topples or fails.) While non-emergency situations provide ample time for planning such that the impacted off-site piping systems and the associated operating units can be properly located, the emergency event requires rapid response. Rapid response to isolate a failure can prevent and reduce spills and the subsequent escalation of fires, isolate a failure or spill and minimize injuries to personnel, the environment, potential damage to the facility and the surrounding community.

Most refineries and petrochemical facilities have a rudimentary form of identifying off-site piping lines, but also rely upon the vast knowledge and experience of its employees to identify off-site piping and the necessary safety measures in the event that it necessary to isolate a particular operating unit, tank or off-site piping line. This process can be extremely time consuming and is subject to human error. It is possible that the particular individual may or may not be aware of a recent modification to the off-site piping line, the location of all valves or secondary valves in the event of the failure of the primary valve. Furthermore, the knowledgeable individual may not be available, which could result in catastrophic events.

There is a need for a structured process for accurately geographically correct mapping off-site piping lines in refinery and petrochemical facilities to provide an accurate representation of the off-site piping line to aid in the reduction of response time during an emergency event in a refinery or petrochemical facility. There is a further need for an interactive on-line system for providing rapid response to emergency events using the accurately mapped off-site piping lines.

BRIEF SUMMARY OF THE INVENTION

It is an aspect of the present invention to provide a method for mapping an off-site piping system within a refinery or petrochemical facility. The off-site piping system includes one or more off-site piping lines which interconnect various operating units with other operating units, storage units, distribution facilities and the like. Each line includes a plurality of piping and other piping objects including but not limited to in-line valves (e.g., regulator valve, shut off valves, diverter valves, etc.), and other piping objects (fittings, connectors, vents, drains, sensors, clamps etc.). A distinct substance flows through the piping. The distinct substance may include but is not limited to natural gas, high pressure steam, water, crude oil, fresh and foul MEA, petrochemicals and the like. Many of these substances are inherently hazardous, either due to their physical condition (e.g., high/low temperature, high pressure) or chemical properties (e.g., toxicity, flammability). Located throughout the off-site piping system are one or more valves, and other piping objects which permit the linking of lines, their operation, and the isolation of the same and the isolation of storage facilities and operating units. The facility will contain multiple off-site piping lines. The off-site piping lines are grouped in one or more pipebands traversing the facility. Each pipeband contains one or more individual off-site piping lines.

The method in accordance with one aspect of the present invention includes obtaining at least one aerial image or three dimensional image of the facility. The image may be obtained from aerial photographs of the facility. It is also possible to use 3-D laser scanning technology to obtain a representation of the facility. The at least one image identifies the approximate locations of each of the at least one off-site pipebands, the locations of each operating unit and the storage units or tanks and other geographical identifiers. The images further identify the location of facility buildings, streets, access ways, electrical stations, fences, gates, flares and other equipment and landmarks associated with the facility. The pipebands traversing the facility are identified. Select roadway intersections within the facility are located and identified as the prime form of landmark identifier. It is contemplated that each of the select roadway intersections and other landmark identifiers being located in the vicinity of at least one off-site piping line or pipeband.

The method further includes locating and identifying at least one location in the facility for graphical cross-sectional representations or cut sheets of the pipebands, which contain the off-site piping lines. The cut sheets are preferably mounted adjacent the pipeband at or near an intersection such that they may be readily accessed and viewed by facility personnel. A cut sheet is prepared or mapped for each identified location. Each cut sheet identifies each of the off-site piping lines at the location of the cut sheet in addition to other descriptive information. The descriptive information may include but is not limited to the unique identifier, the size of the piping at the location, the distinct substance flowing therethrough, the location of the closest valve or operating unit, HAZMAT information, Material Safety Data Sheets (MSDS), HAZOP information, line ownership information, inspection information and maintenance information associated with the particular off-site piping lines. Each cut sheet is assigned a unique identifier for quick reference, such that the cut sheet may be readily located and identified within the facility.

The method in accordance with the present invention also includes mapping each off-site piping line. Each off-site piping line is assigned a unique identifier. The mapping of each off-site piping line includes traversing or walking the entire length of the off-site piping line to identify the location of the off-site piping line with respect to other components contained in the facility including but not limited to operating units, storage tanks, buildings, fences, gates and other identifying features. The mapping of the off-site piping line may also be accomplished using 3-D laser scanning technology.

Each valve and other piping objects contained within the off-site piping line is accurately and geographically correctly located, assigned an identifier and included on a representation of the line. Furthermore, additional description information is provided for each piping object. For example, the information may include a description of the object, when it was installed, inspected, etc.

The location of cut sheets with respect to the off-site piping line are identified and located on the representation of the line. The cut sheet is reviewed to ensure that the line is properly identified and located on the cut sheet. The diameter of the piping is also identified on the representation. Other information relating to the piping may also be added to the representation including but not limited to whether or not the line is insulated. It is also contemplated that other utility systems (e.g., power, communications) and other systems (e.g., sewers) traversing the facility may be added to the representations to illustrate their location with respect to the lines.

In accordance with an aspect of the present invention, it is contemplated that the individual cut sheets and representations of the lines may be set forth in tangible or electronic form. When in electronic form, it is further contemplated that the cut sheets and the representations may be linked such that the representations can be easily searched in a database to permit a user to easily move from one representation to related representations.

The present invention is also directed to a system for emergency isolation and response for use in a facility having an off-site piping system. The system enables rapid response to emergency events to minimize the impact on the facility, personnel, the environment and the surrounding community. The system includes a searchable database containing at least one representation of each off-site piping line including its location within the facility, and at least one cut sheet for each of the at least one pipeband, wherein each cut sheet illustrates the at least one off-site pipe line extending through the pipeband at the particular location of the cut sheet within the facility. The system also includes a computer operating unit for storing the searchable database and retrieving representations and cut sheets. The computer operating unit and the database may be located at the facility or remotely located off-site. The system further includes at least one terminal for accessing and displaying representations and cut sheets retrieved by the computer operating unit. The terminals permit the facility personnel to access and search the database. The database permits rapid review of the representation to identify and the display the necessary representations for a particular line and cut sheet.

It is another aspect of the present invention to provide a method of isolating an event in a facility. The event may be an emergency event requiring rapid response or a non-emergency event such as a maintenance procedure, a planning project or a training operation that involves or may impact upon an offsite piping band. It is also contemplated that the system may be used to isolate an event in on-site piping (i.e., piping within the operating unit) in an operating unit in the facility. The method includes identifying the location of the event in the facility. The process of identifying the location of the event includes identifying one of the pipeband, off-site piping line, a facility unit and a land based identifier to identify the location of the event. The method also includes performing a search to identify the pipebands and facility units impacted by the occurrence of the event. The search is performed based upon the identification of one of the pipeband, off-site piping line, a facility unit and a land based identifier to identify the location of the event. The search is conducted using an electronic database of representations and cut sheets for each of the piping lines, which is searchable based upon the identification of one of the pipeband, off-site piping line, a facility unit and a land based identifier to identify the location of the event. Finally, the method includes identifying measures to isolate the event.

These and other aspects of the invention will become apparent when taken in conjunction with the detailed description and appended drawings.

DESCRIPTION OF THE DRAWINGS

The invention will now be described in conjunction with the accompanying drawings in which.

In the drawings, like reference numerals indicate corresponding parts in the different figures.

DETAILED DESCRIPTION OF PREFERRED EMBODIMENTS

The mapping of a refinery/petrochemical facility will now be described in greater detail in connection with the figures. While the present invention will be described in connection with a refinery and/or petrochemical facility, hereinafter referred to as a facility, as illustrated on the display 140 of the monitor 130 of the system 100, the present invention is not intended to be so limited; rather, it is contemplated that the mapping process described herein may be used in connection with other facilities, which incorporate off-site piping, other similar piping systems and other structures over a large surface area. It is also contemplated that the mapping process described herein and the system described below maybe used in connection with piping connecting refining facilities with petrochemical facilities, other pipelines, which may be outside of the facility, as well as, the individual process units and storage units within the facility. For example, it is contemplated that the process may be used in pharmaceutical manufacturing facilities, facilities for manufacturing gases and other pipe based facilities.

While facilities may have offsite piping plans and other materials detailing the layout of the offsite piping within the facility, these plans may be outdated and not easily accessible. In order to obtain a proper representation for purposes of mapping the facility in accordance with the present invention, at least one aerial image or 3-D representation is obtained of the facility and the surrounded area, which provides an accurate and current representation of the facility, the location of the operating units, storage tanks, off-site piping systems, building locations and the location of buildings and other structures in the surrounding community. The identification of units, tanks, systems and buildings in the facility are necessary to properly map the off-site piping systems and provide easily identifiable points of reference for refinery personnel. The identification of structures and roadways in the surrounding community is useful in the event that an emergency event occurs at the facility, which may require the evacuation of the surrounding community within a certain radius of the facility. The aerial images or representations should be of sufficient quality and resolution such that the individual operating units, the various structures at the facility and the interconnecting pipebands can be readily identified.

Figure 1:
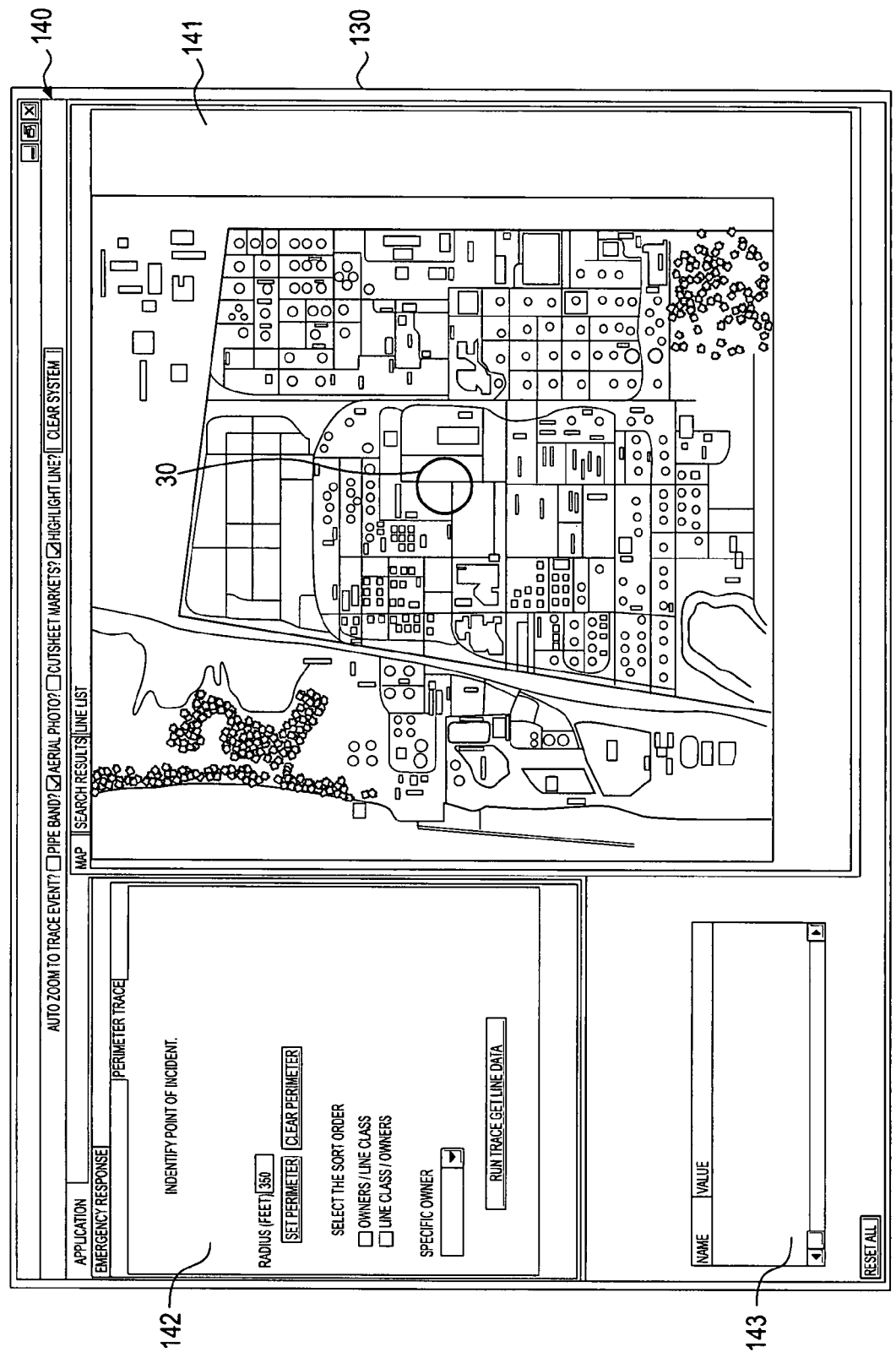
FIG. 1 is an example of an aerial representation of a facility illustrating a perimeter trace in a mapping system according to an embodiment of the present invention.
Figure 2:
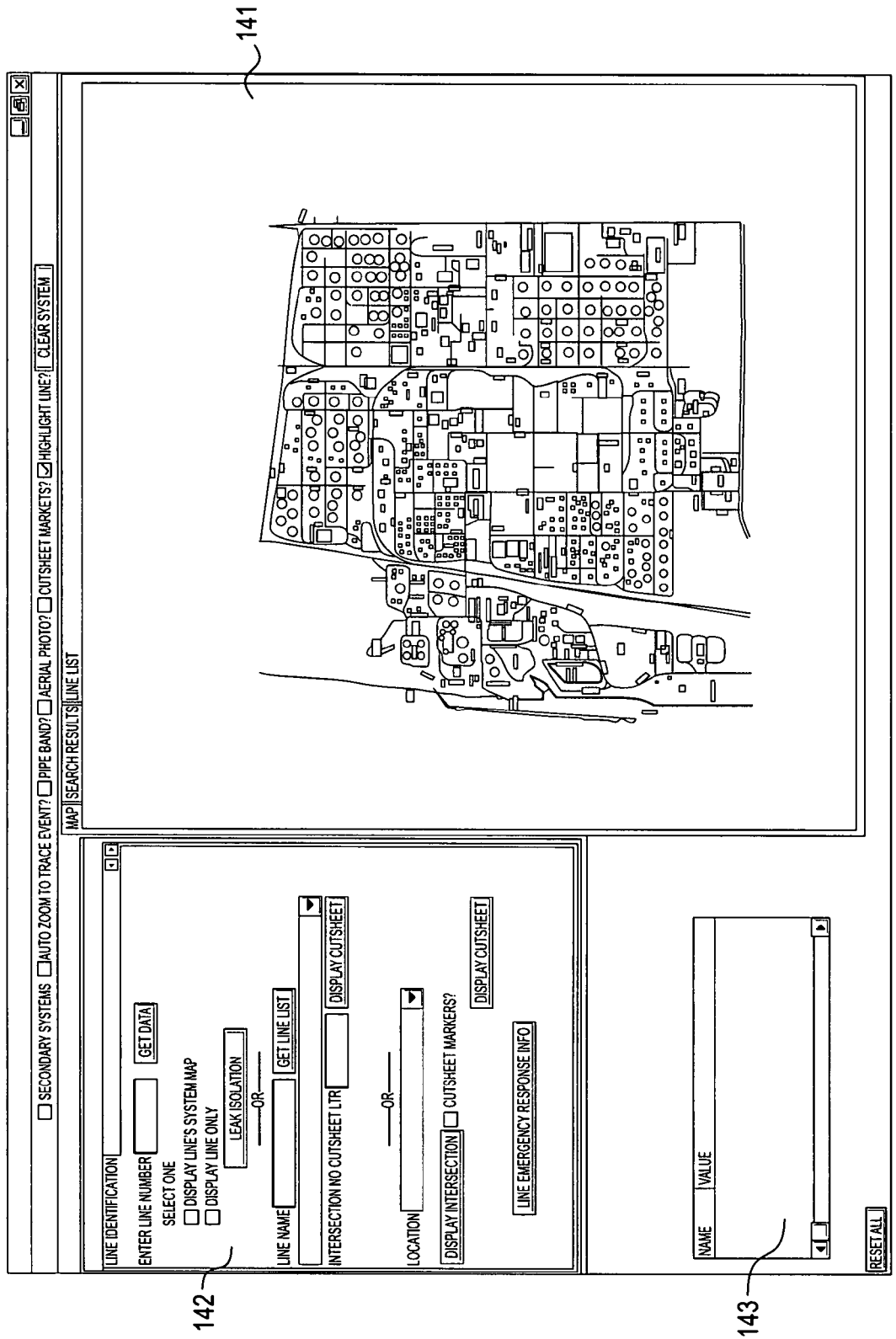
FIG. 2 is an example of a graphical representation of the facility of the FIG. 1 used in accordance with the mapping system according to the present invention.

It is preferable that the aerial images of the facility and surrounding community be digitized such that the images can be stored within a searchable electronic database. An example of a digital aerial image is illustrated in FIG. 1. The image can be incorporated into an emergency isolation and response system 100 illustrated below. The use of an electronic database 120 will permit easy retrieval and access of the images when needed for emergency response, planning and other events which require accurate knowledge of each of the components of the facility. As will become more apparent, the aerial images will provide a background for the mapping of the off-site piping systems within the facility.

Returning to the facility mapping process according to the present invention, the aerial images are used to identify buildings and operating units within the facility, as shown in FIGS. 1-4, 9 and 10. Each building and operating unit is identified with an identifier that is unique for the particular building and/or operating unit. The identifier, for example, may be the building name or the common identifier for the particular operating unit (e.g., the "Alky Unit" or the "South Crude Unit"). Storage units are also identified and assigned an identifier that is unique to each storage unit. The roadways 20 and access routes within the facility are also identified. A display illustrating roadways is depicted in FIGS. 7 and 11-14. The intersections of the roads and access routes are identified. While it is not necessary, it is preferable that each of the intersections is provided with an identifier that is unique to the particular intersection. Intersections that are located in the vicinity of an operating unit, a storage facility or off-site piping must be identified. The identification of intersections provides points of reference for communications between facility personnel and other responding personnel in the event of an emergency or non-emergency event.

Figure 5:
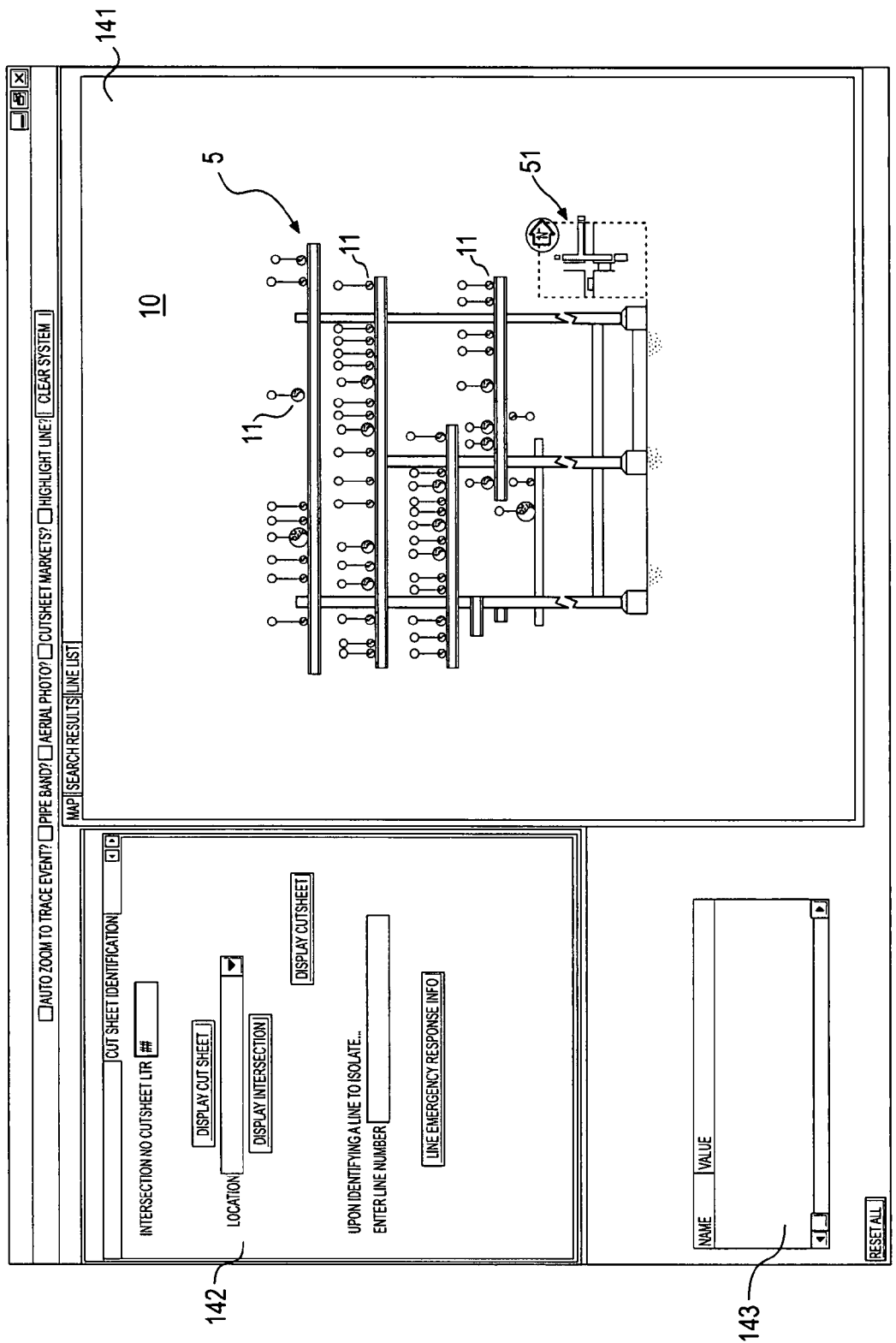
FIG. 5 is an example of cut sheet for use in the mapping system in accordance with the present invention.
Figure 6:
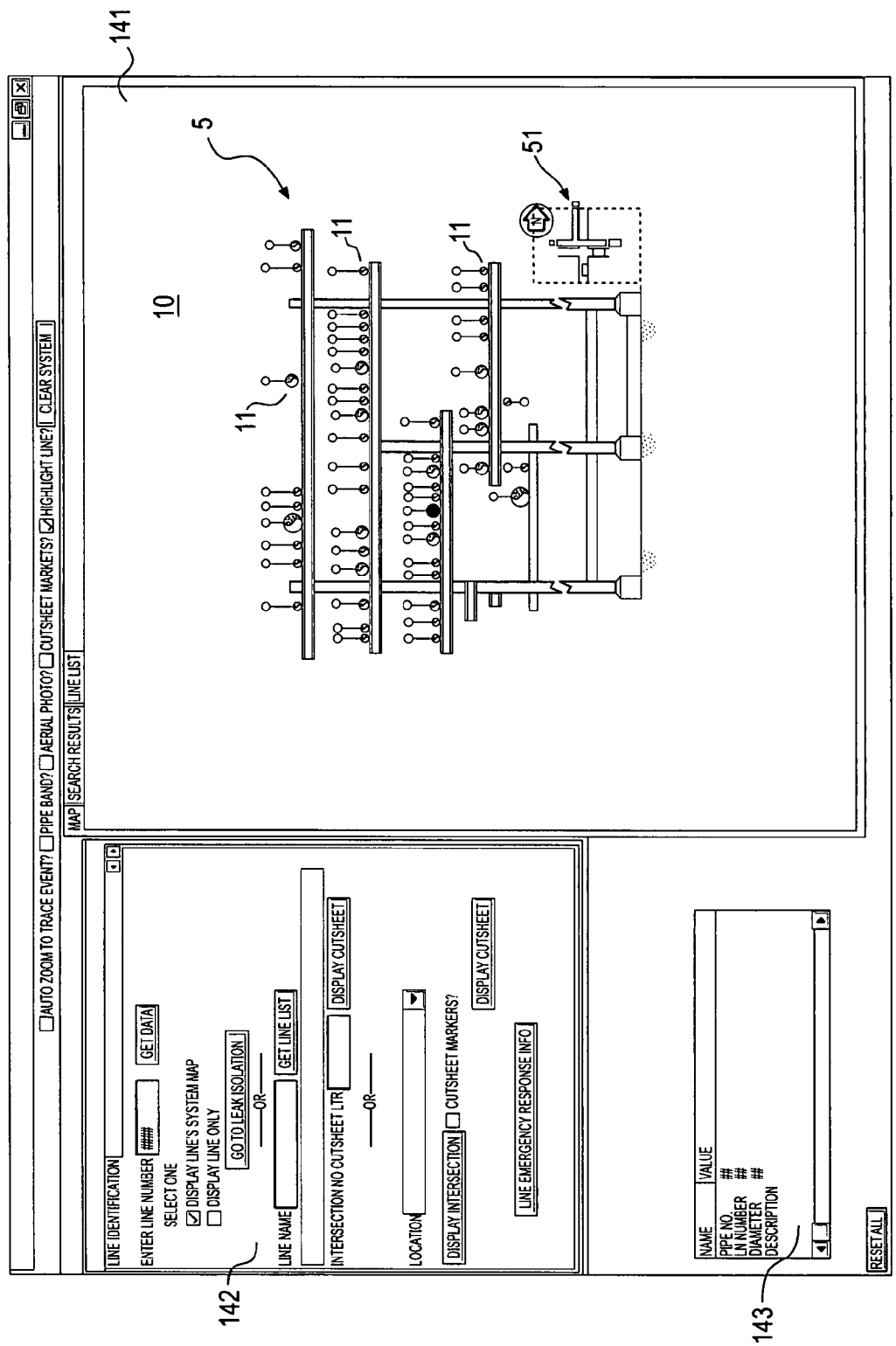
FIG. 6 is another example of a cut sheet highlighting the off-site piping line of FIG. 4.

A plurality of pipebands traverses the facility. Each of the pipebands contains one or more off-site piping lines, which contain the piping which interconnects the operating units contained in the facility with other operating units, storage tanks, distribution facilities and other processing equipment. A representative example of a pipeband is shown in FIGS. 5 and 6. The pipebands may contain several thousand miles of off-site piping. Each pipeband 10 includes at least one off-site piping line 11. It is possible that a pipeband may contain well in excess of one hundred fifty (150) separate off-site piping systems. Each off-site piping line transports a discrete substance in either liquid or gaseous form including but not limited to hydrogen gases, oxygen, steam, water, crude oil, paraffins, petrochemicals and the like. It is contemplated that any number of off-site piping lines may be contained in a given pipeband. It is also contemplated that a particular off-site piping line may travel through one or more pipebands as it traverses the facility. It is important to know the identity of the discrete substance flowing through the piping lines and the components connected thereto at any location within the facility.

In accordance with the present invention, locators are located throughout the facility adjacent intersections and at other predetermined locations to provide an identification to facility personnel, of which off-site piping lines are located at a particular location. The locators are chosen based upon proximity to intersections, access ways and other geographically significant identifiers. The locators comprise a cross-sectional representation of the pipeband at that location. This cross-sectional representation is hereafter referred to as a cut sheet 5, as shown for example in FIGS. 5 and 6. Each cut sheet provides a representation of all of the off-site piping lines contained within a particular pipeband at the location of that particular cut-sheet. The location of each off-site piping line within the pipeband is illustrated in addition to the relative size of the piping associated with each off-site piping line. As shown in FIGS. 5 and 6, the piping lines 11 have different diameters. Furthermore, the diameter of a specific piping line may vary. Each off-site piping line is separately labeled with a unique identifier for identification purposes. The cut sheet 5 also includes a directional indicator 51 such that the facility personnel can properly orient themselves when viewing the cut sheet and its associated pipeband. Each pipeline in the vicinity is labeled with the identification provided on the cut sheet such that the facility personnel can readily locate the piping lines 11 in the pipestand. For purposes of identification, the unique identifier assigned to a particular off-site piping line is consistently used through out the facility. As such, if a particular off-site piping line traverses multiple cut sheets, the same identifier will be used to represent that particular off-site piping line on each cut sheet. The particular location of the off-site piping line and the graphical depiction of the size of the piping may vary based upon the location of the piping within the pipeband at the particular location and the size of the piping at that location.

It is contemplated that the cut sheets 5 may be provided on-site in accordance with the present invention and may make take one of several forms. The cut-sheet may take the form of a hard copy, or a hard copy of an electronic drawing. The hard copy may be located in an appropriate mounting assembly to permit easy viewing by the facility personnel, yet be protected from prolonged exposure to the environments. It may also be illuminated for night viewing. The cut sheet can be updated and replaced when necessary (e.g. the pipeband is modified to remove or add off-site piping lines). It is also contemplated that the cut sheet may be electronically displayed on a display monitor, which is part of the response system 100. The monitor may be a touch screen that permits access to the cut sheet and the representations of the off-site piping lines associated with that cut sheet. The monitor may be connected to a central computer unit 110 containing a database 120. Any updates or revisions to the cut sheet may be automatically pushed to and displayed at the location corresponding to the particular cut sheet. With such arrangement, it is contemplated that the display panel may be interactive such that the facility personnel can identify the particular substance flowing through the off-site piping, the status of each off-site piping line (i.e., whether or not such piping line is operational or not in use) and the operating units and other components linked to the specific off-site piping system. It is further contemplated that a transmitter or transponder may be located at or near the location of each cut sheet. Instead of providing a physical copy of the cut sheet or a display monitor for viewing the cut sheet, a signal identifying the cut sheet can be transmitted to a hand held device, pda or computer. The hand held device, pda or computer would recognize the particular signal and display the necessary cut sheet for viewing by the facility personnel. It is also contemplated that a bar code may be provided at a location of each cut sheet. Facility personnel having an appropriate handheld reader and display can scan the bar code to display the relevant cut sheet. It is also contemplated that each pipe line 11 within the pipe band may be labeled with an appropriate bar code such that facility personnel can access the representation and descriptive information for a specific pipe line 11. The scanned information can be transmitted to the user such that the user can view the representation for the pipeline and notify factory personnel of the appropriate measures.

Each cut sheet is created by either facility personnel and/or draftspersons who prepare the diagram of the cut sheet at the particular location of the cut sheet. Facility personnel then identify each of the individual off-site piping lines at the location of the cut sheet. It is contemplated that the cut sheets may be created using any one of several known techniques. The cut sheet may be prepared as a paper drawing. It is also contemplated that the cut sheets may be prepared electronically using CAD based systems or any other system capable of creating electronic drawings. While paper drawings may be acceptable, an electronic cut sheet has its advantages. Multiple hard copies can be made, updates can be easily performed. The electronic versions may be linked to other cut sheets and drawings of off-site pipe lines, as discussed in greater detail below. Each cut sheet is preferably created on site and crosschecked for accuracy.

Once the location of cut sheets are identified, the mapping of individual off-site piping lines can be accomplished. Given the size of refinery and petrochemical facilities, the number of individual off-site piping lines connecting the operating units and the miles of piping present, the mapping of the individual off-site piping lines can be a complex, labor intensive and time consuming process, but it is an essential part of maintaining the integrity and functionality of a functional mapping system. Each off-site piping line is mapped in a similar manner. A starting point for each off-site piping line is determined. The starting point may be located at a storage tank, a particular operating unit or other unit. The length of each off-site piping line is then traversed or walked. Along the length of the line, the diameter of the piping is tracked, the specific location of every valve, diverter, connection, other piping objects, and connections to operating units are identified. The location of each cut sheet through which the piping passes is also identified. Using this information, a representation of each off-site piping line is created.

Figure 7:
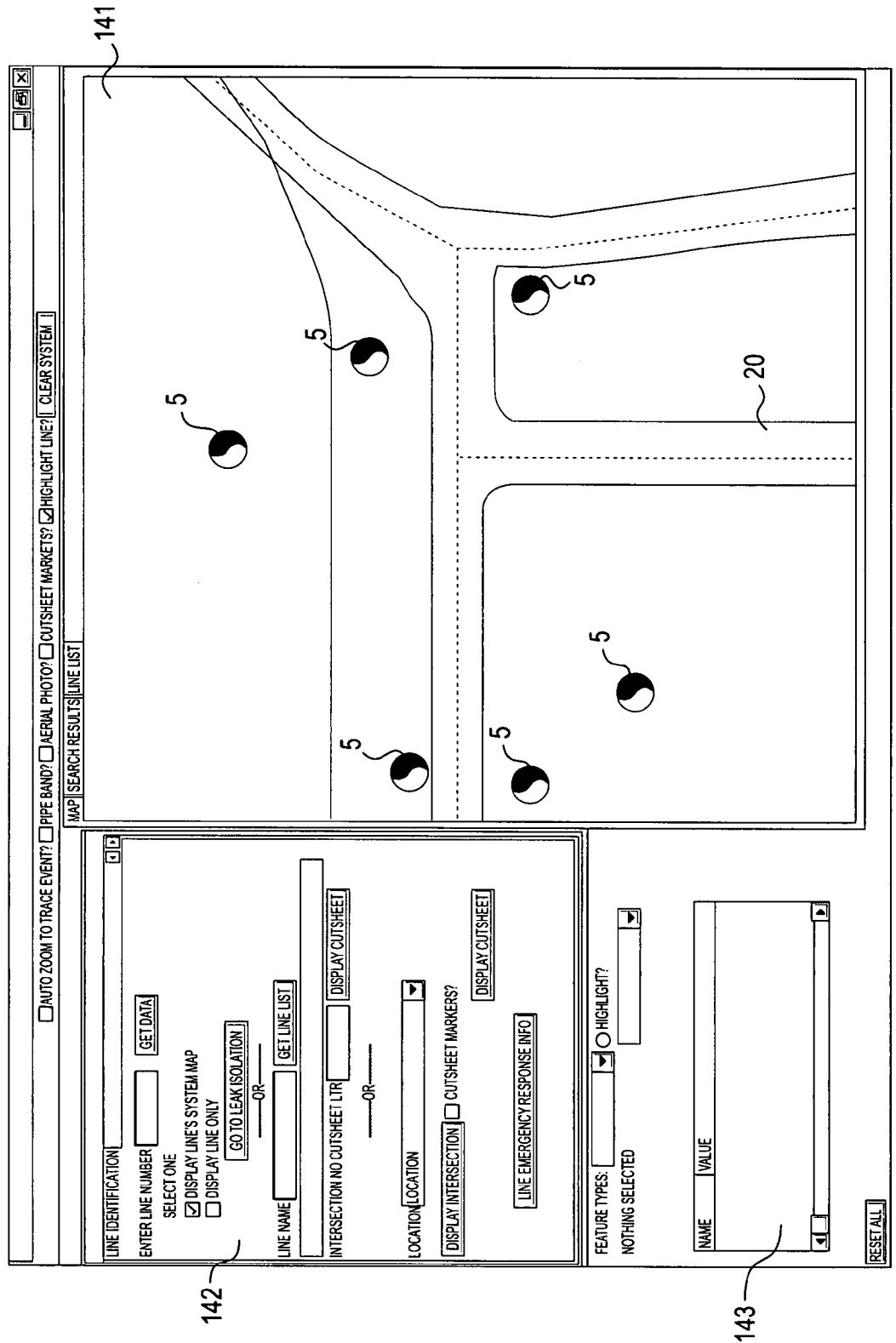
FIG. 7 is an illustration of the mapping system according to the present invention illustrating an intersection within the facility and the locations of cut sheets.
Figure 8:
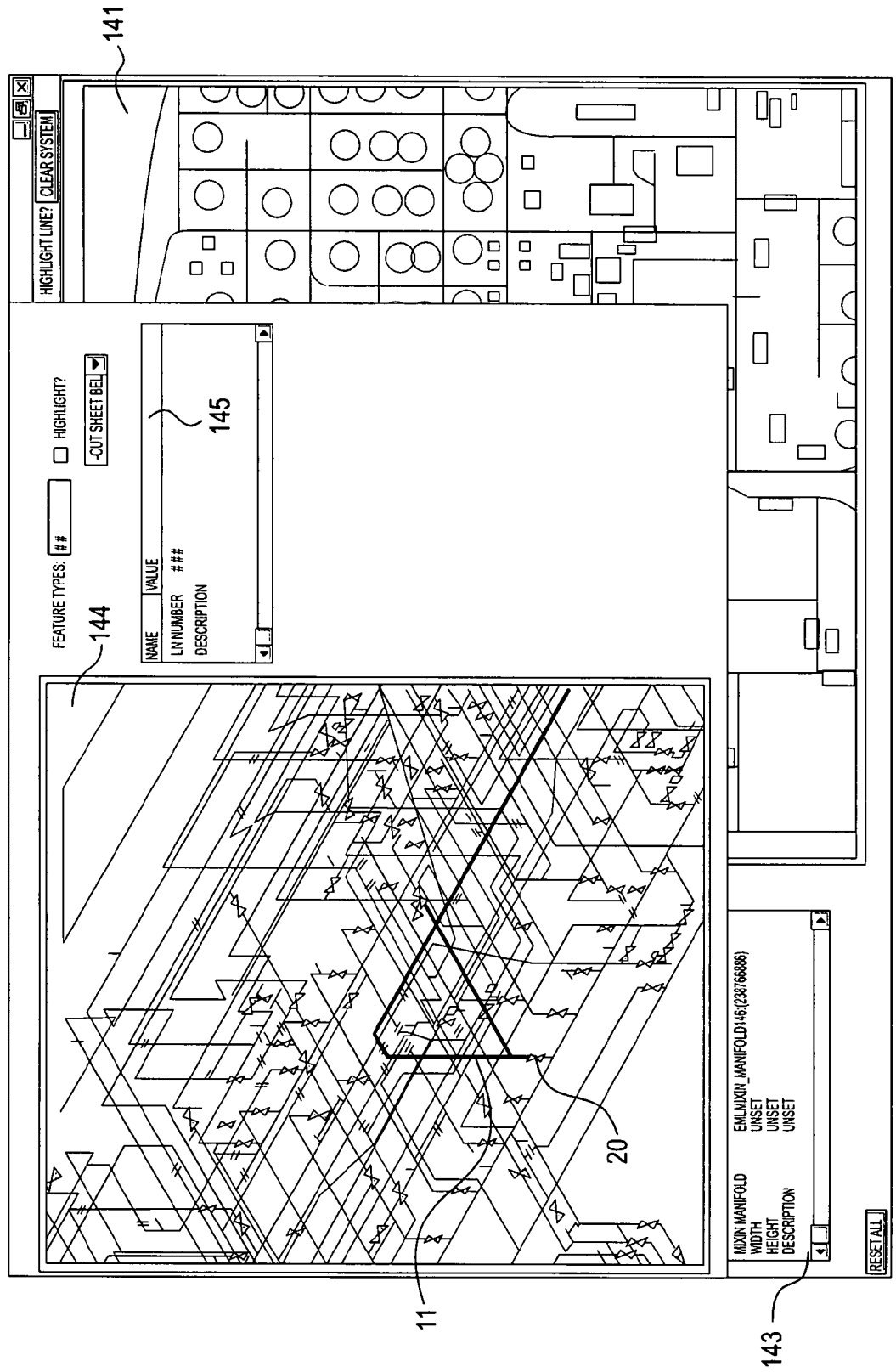
FIG. 8 is an isometric illustration highlighting an off-site piping line within the facility.

The representation may be created in one of several ways. For example, the representation may be drawn by hand, created electronically using a portable computer or other appropriate device. Facility personnel may create a hand drawn image or a CAD image that is later electronically transferred and entered into the database 120. It is also contemplated that the creation of a hand drawn image may be omitted using a portable computer or other appropriate device to create a representation of the piping line as the facility personnel walk the particular off-site piping line. An electronic representation of the off-site pipeline may be stored in a database 120. Whether the representation is created by hand or using an appropriate electronic device, each representation may be linked to other representations and cut sheets within the database 120 such that facility personnel may navigate through multiple representations and cut sheets, as may be needed when using the system 100. As the personnel walks the length of the off-site piping line, geographical data is entered onto the drawing directly or into the computer to properly and accurately locate the off-site piping line and piping objects with respect to its surroundings. As the personnel approach a cut sheet location, the particular cut sheet is accessed. The personnel then identify the off-site piping line on the appropriate cut sheet. This provides a linking of the cut sheets with the individual plan views of the off-site piping lines. Once a particular off-site piping line is walked, the representation is then created. Each piping object is identified by a unique identifier and labeled on the representation and provided with the appropriate description. If the piping object appears on multiple representations, the same unique identifier is used to reference that piping object. A description of the off-site piping line including the discrete substance flowing therethrough, the facility units connected thereto, other piping lines connected thereto and the location of the piping objects is prepared. The description may further include information relating to the party within the facility responsible for that particular line along with contact information (i.e., line ownership information). The description may also include other essential information including but not limited to the pressure and temperature of the discrete substance flowing through the particular piping. Material Safety Data Sheets and HAZMAT and HAZOP procedures for the particular substance may also be included. This information will be extremely useful in determining (i) how the material is to be handled, and (ii) if an evacuation is necessary in the event that an emergency event occurs. The descriptions are reviewed and checked for accuracy and completeness. The information can then be added directly to the representation or linked to the representation. When viewed as a hard copy or paper representation, the information may be located in an appropriate key directly on or adjacent the valve or other piping object. In the case of an electronic representation, the description may appear in a separate window 143 on the display, as shown, for example in FIGS. 1-14 and 16-18. It is also contemplated that the electronic representation may be interactive. With such an arrangement, the person viewing the representation may move a cursor to a particular piping object in display window 141. Locating the cursor on the piping object or clicking on the piping object may result in a display for the particular piping object appearing directly adjacent the piping object or in an adjacent window on the display, as shown in FIG. 8. A separate display window 144 may be opened to display a detailed view of the off-site pipe line 11. Such a display is provided when the off-site piping line 11 has a complex configuration. Additional descriptive for the line and its components may be displayed in a window 145 adjacent display window 144.

This descriptive information forms an important aspect of the emergency isolation and response system 100, described in greater detail below. Using the descriptor information, the facility personnel can quickly identify which operating units are connected to a particular off-site piping line, which off-site piping lines are linked either directly or indirectly through an operating unit to each other. This information is essential when an emergency response event occurs. If the approximate location of the emergency event is determined, the facility personnel can quickly identify using the cut sheets and off-site piping lines representations, which pipebands, operating units, etc. are impacted by the event. With this information, the facility personnel can then identify which safety measures must be undertaken in order to isolate the event and determine which operating units, storage tanks, and other off-site piping lines are impacted in order to minimize the overall impact of the event and limit impact on the facility and surrounding community.

Figure 4:
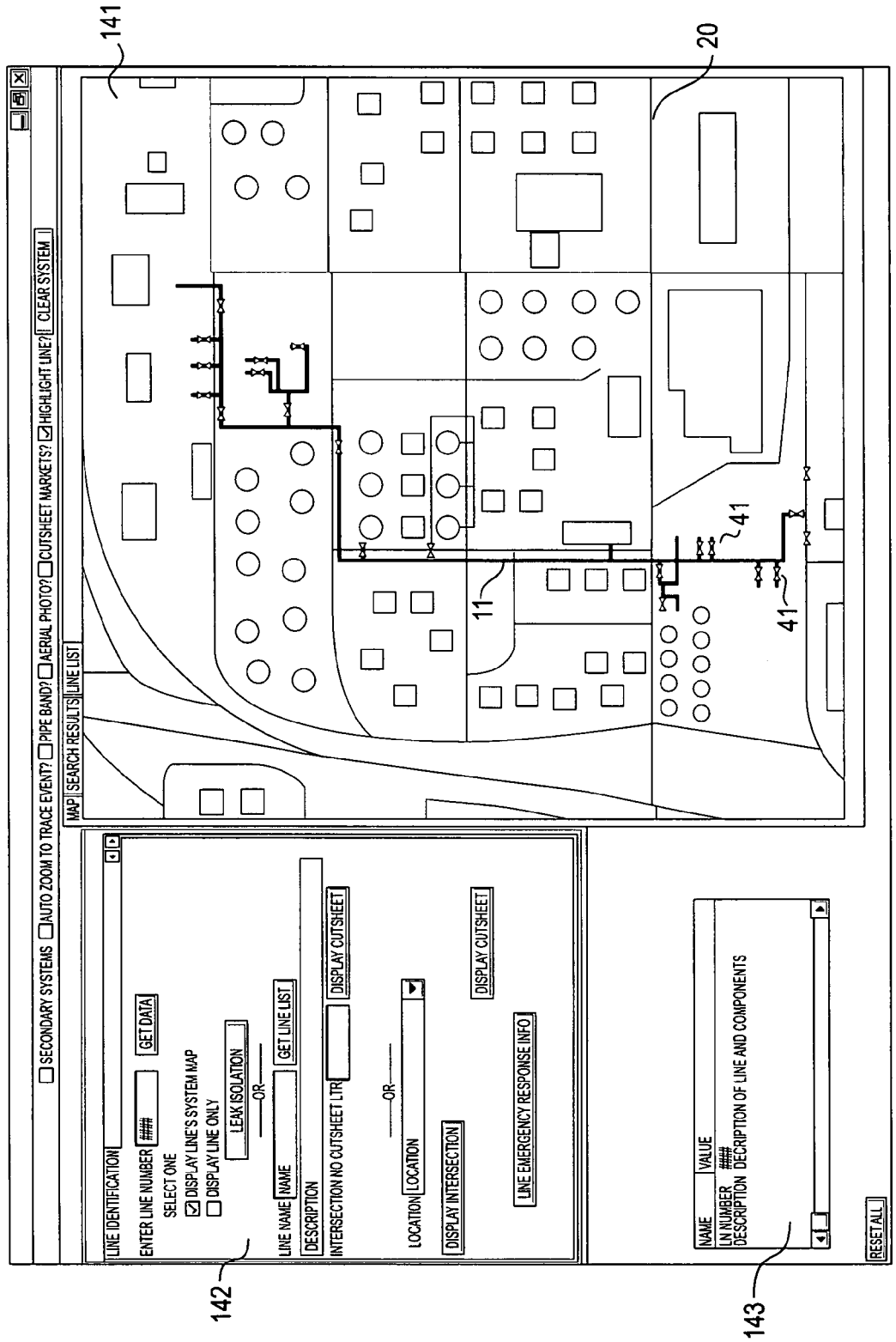
FIG. 4 is another example of a representation of an off-site piping line having a particular off-site piping line highlighted.

Preferably, two dimensional and isometric graphical representations of the off-site piping lines are prepared. A sample two dimensional representation is illustrated in FIG. 4. A sample isometric representation is illustrated in FIG. 8.

In accordance with a preferred embodiment of the present invention, the two dimensional and isometric representations and the cut sheets are preferably maintained in electronic form in a database 120. The electronic storage permits easy access by multiple facility personnel. Furthermore, the electronic representations can be easily updated when modifications to the off-line piping lines are performed, when operating units are operational or not operational. Furthermore, the descriptive information related to line ownership, the substance contained in the line can be easily updated and made available to all facility personnel such that the information available to facility personnel is current and accurate. Additionally, the electronic images can be easily transmitted to the necessary emergency response/management personnel in the surrounding community in the event that the surrounding community is impacted by an event (e.g., fire, explosion, release of gas).

The representations and cut sheets are preferably included in a searchable database 120. The database is searchable based upon any number of parameters. The database may be searched based upon a line identifier to identify a particular line, as shown in search window 142 in FIG. 2. The database may be searched by discrete material to identify those lines containing the discrete substance. The database may be searched by intersection to identify lines and cut sheets located in the vicinity of the intersection. It is also contemplated that the database may be searched based upon the owner of the line such that all lines associated with or under the responsibility of a particular division within the facility may be identified. It is also contemplated that individual representations may be searched to identify a particular line or lines, or piping object.

In accordance with the present invention, the searchable database 120 forms an integral part of an emergency isolation and response system 100 for use in the facility. The emergency isolation and response system is interactive which permits facility personnel to promptly identify facility equipment, units and piping lines that may be impacted in the event of an emergency event, which occurs within the off-site piping system or impacts the off-site piping system, which include but are not limited to weather related emergencies (i.e., floods, wind, lightning, tornados, hurricanes), fires, explosions or release of toxic material due to related to piping failures, spills and other emergency events. A main objective of the emergency isolation and response system 100 in accordance with the present invention is to significantly reduce the time needed to adequately respond to emergency events. This reduction may permit facility personnel to quickly isolate a particular part of the facility, operating unit, etc to contain a spill, fire etc. Furthermore, the isolation of the off-site piping could reduce the escalation of the event, which could result in significant damage throughout the facility and surrounding areas if left unchecked. Additionally, the system may used to the necessary safety perimeter to protect facility personnel and the surrounding community.

Figure 13:
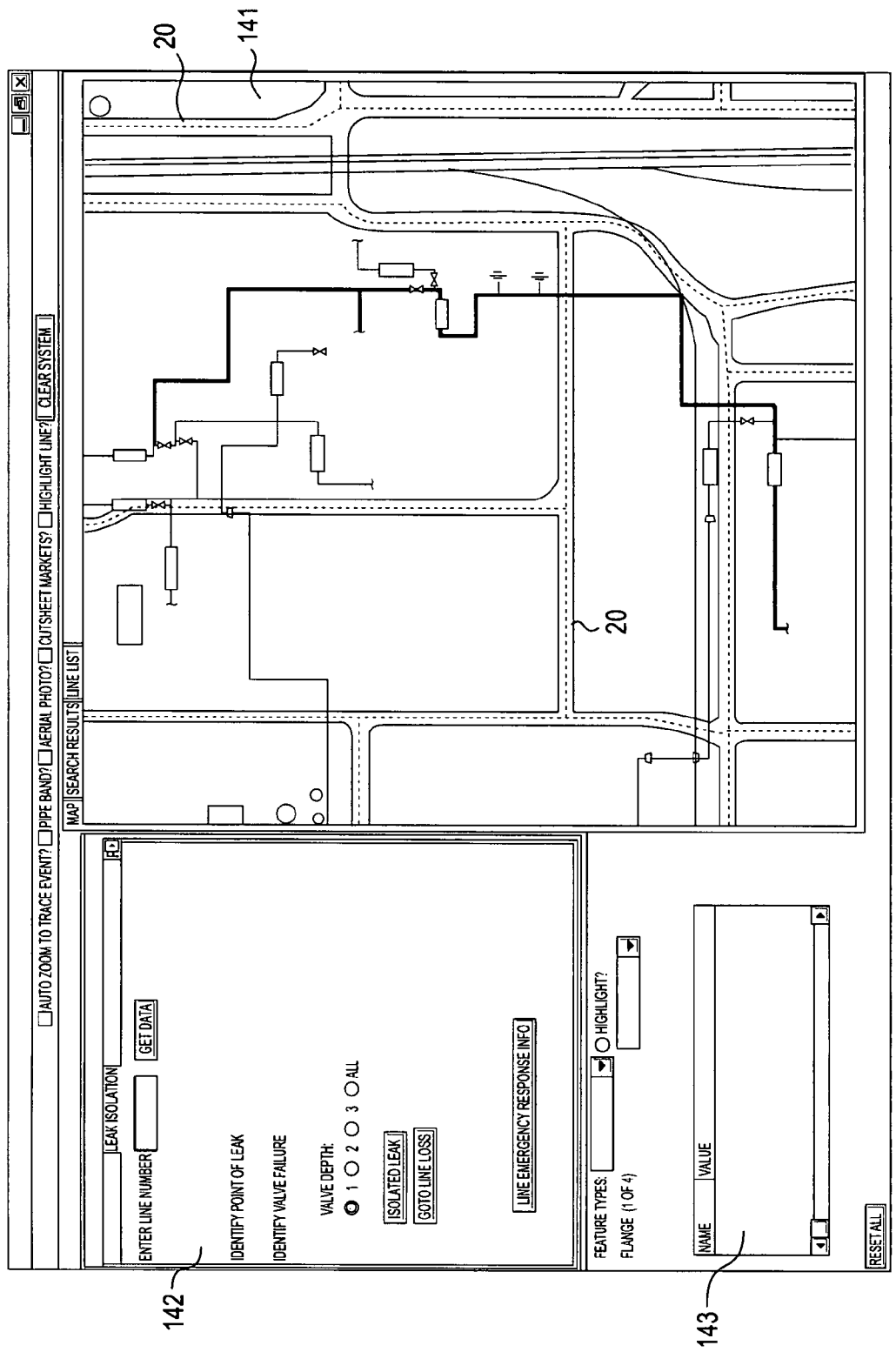
FIG. 13 is an illustration of the emergency isolation and response system of a menu for isolating leaks in accordance with the present invention.
Figure 14:
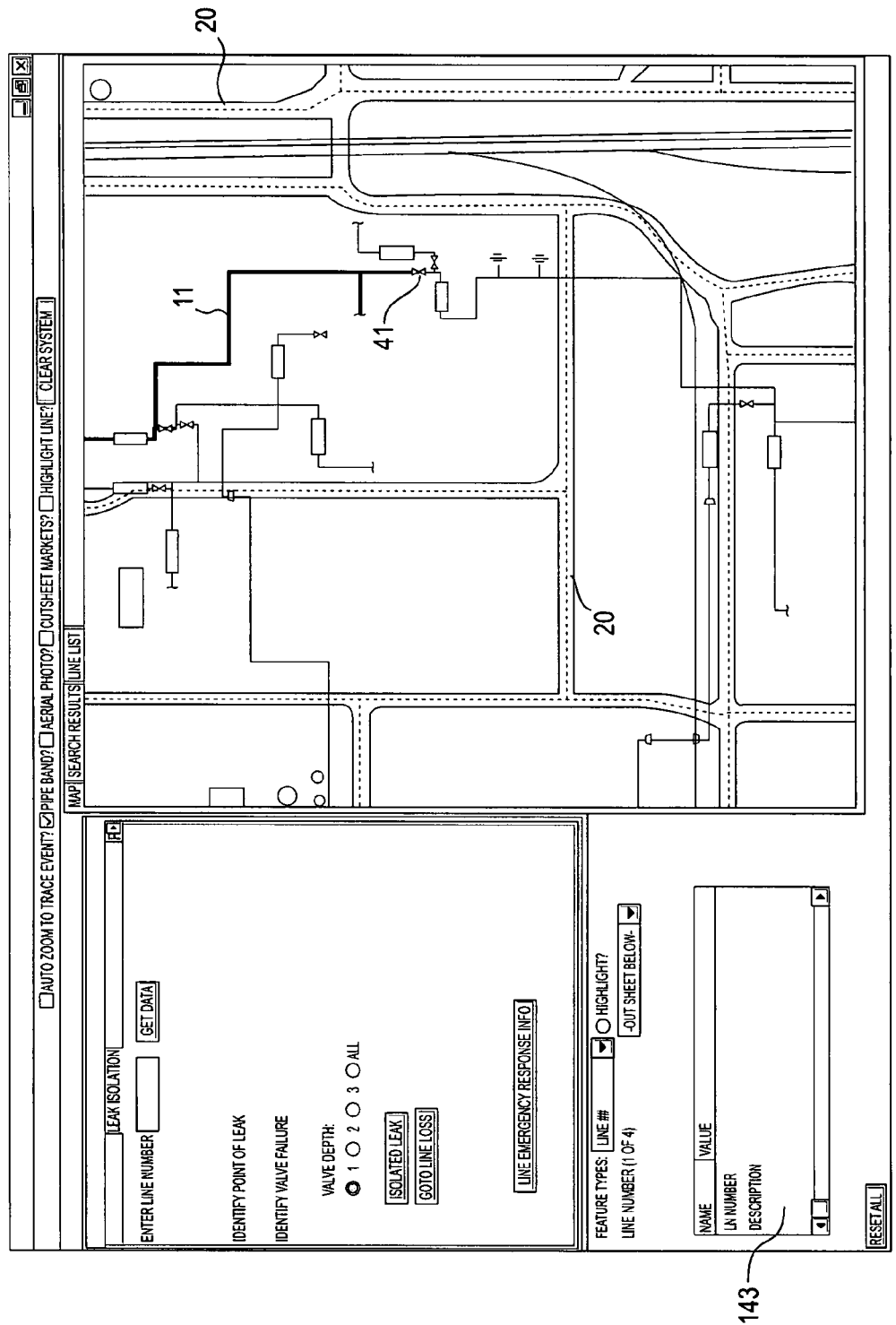
FIG. 14 is an illustration of the FIG. 13 having valves for leak isolation highlighted.
Figure 15:
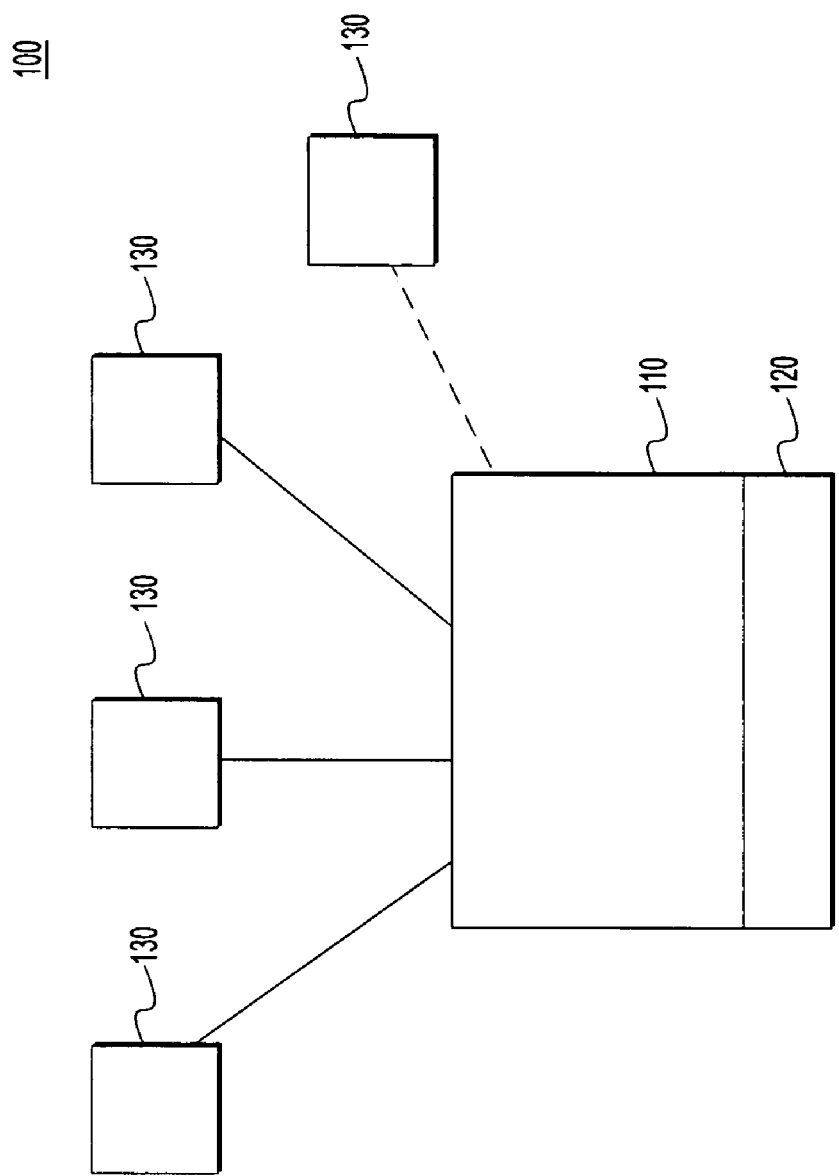
FIG. 15 is a schematic diagram of the emergency isolation and response system in accordance with the present invention.
Figure 19:
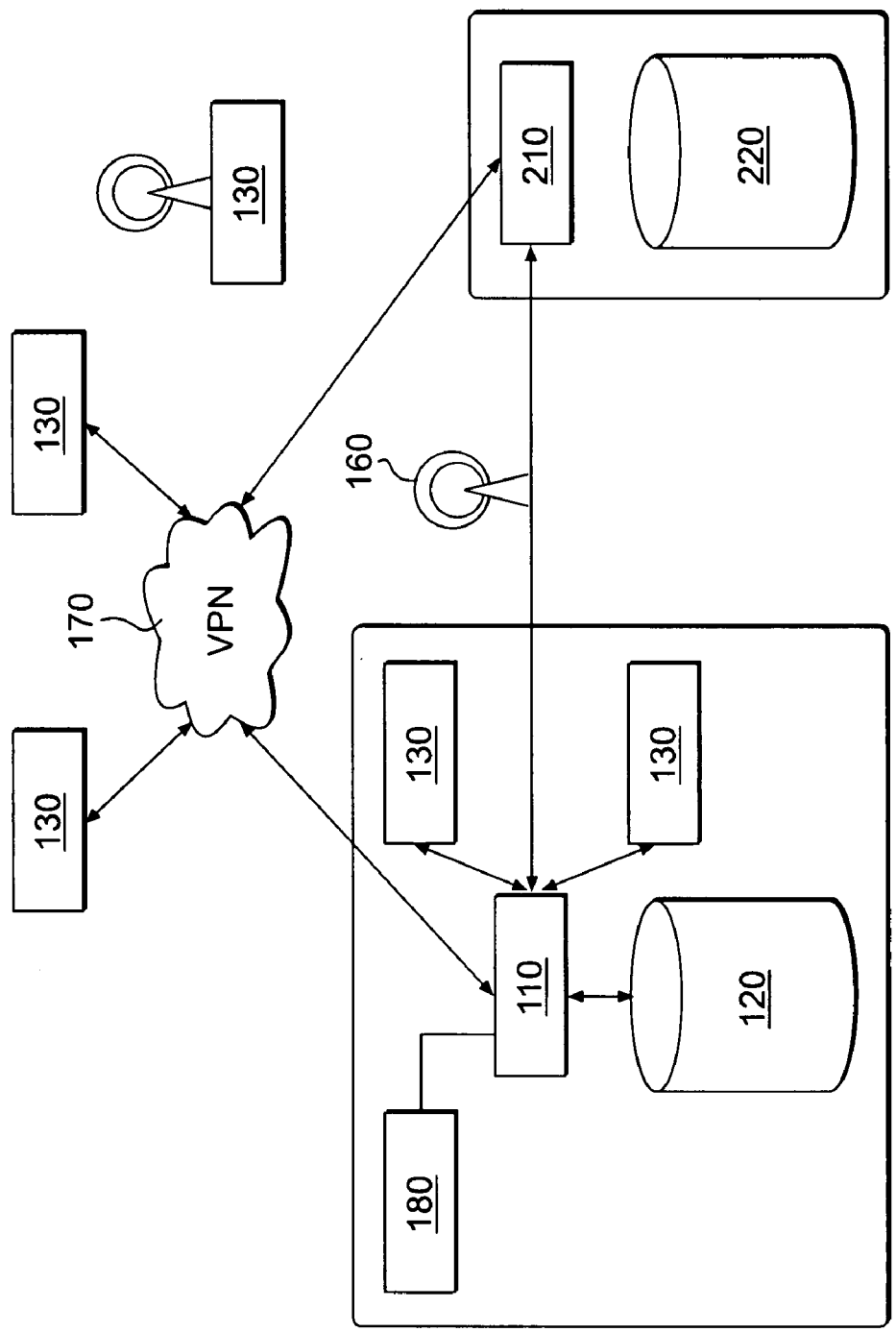
FIG. 19 is a schematic diagram of the emergency isolation and response system in accordance with another embodiment of the present invention.

As shown in FIGS. 15 and 19, the emergency isolation and response system in accordance with the present invention includes an electronically searchable database 120 used in connection with a suitable computer operating unit 110. The system 100 includes at least one terminal 130 operatively connected to the computer operating unit 110 and the database 120. The terminal 130 may be directly connected to the unit 110 as a standalone system. Preferably, the terminals 130 are connected to the unit 110 through a web browser or other suitable connection such as a virtual private network (VPN) 170, as shown in FIG. 19. The terminals 130 may also communicate through a wide area network (WAN) 160. With these arrangements, multiple users can access the system 100 from the terminals 130. Each terminal 130 includes a monitor with an associated keyboard or an interactive touch screen display. The display 140 of the monitor 130 is divided in several areas. A primary display window 141 displays aerial images (as shown in FIG. 1), schematic images of the facility and portions thereof (as shown in FIGS. 2-4, 9 and 10), cut sheets 5 (as shown in FIGS. 5 and 6), and street views (as shown in FIGS. 7 and 11-14). The primary display window 141 can display high level representations, as shown for example in FIG. 9. The scale of the representations can be adjusted such that more detailed exploded views of facility can be displayed, as shown in FIGS. 3, 4, 7, 11-14. A search window 142 permits the user to select and enter desired search parameters. A description window 143 provides information (e.g., line owner, substance, maintenance information, etc.) relating to a selected cut sheet, valve, pipeline, etc. It is contemplated that the computer operating unit 110 and the database 120 may be located at the facility or remotely located from the facility for backup purposes, disaster recovery purposes. A redundant back-up computer operating unit 210 and database 220 may also be remotely located, which serves as a backup in the event of a failure of the primary system located at the facility. The back-up computer operating unit 210 is connected to the computer operating unit 110 through the WAN 160, as shown in FIG. 19. In order to ensure system integrity, it is contemplated that a limited number of facility personnel will have the ability to modify and/or replace representations, cut sheets and images contained within the system. All other users of the systems will have read only access to the system, which will permit those users to search, retrieve and review information but not change the same. The system 100 is preferably linked to other systems (e.g., alarm systems, fire and emergency response systems) such that information obtained from the system 100 can be easily disseminated to others. The system 100 may be linked to other modeling systems 180 (e.g., dispersion modeling systems, etc.), which can be used to predict the extent of debris dispersal or potentially toxic clouds in the event of an emergency event (e.g., explosion). This information may be fed into the system 100 such that a safety perimeter may be established.

The operation of the emergency isolation and response system in accordance with the present invention will now be described in greater detail in connection with several examples. In the event of the occurrence of an emergency event associated with a leak in a particular off-site piping line, the appropriate plant personnel (hereinafter referred to as a user) access the system 100. The user can search for the appropriate line using one of several search parameters including the line number, the particular line name (which may include a description of the distinct substance contained therein), the intersection number of the intersection near the leak or a cut sheet number.

Figure 3:
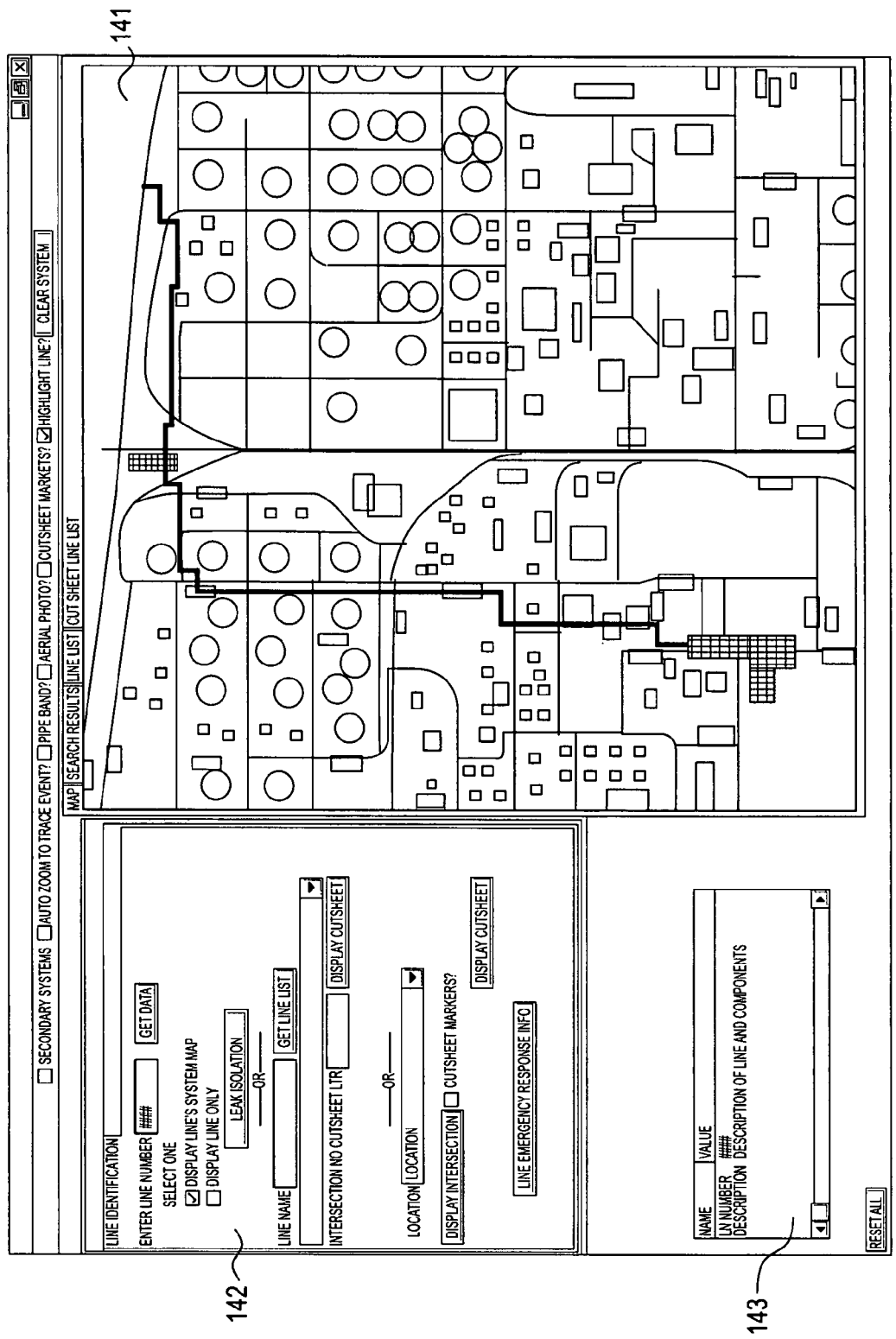
FIG. 3 is an example of a representation of an off-site piping line.

A search utilizing the line identifier will now be described. The user is presented with a menu, shown in FIG. 2 in search window 142. When the user enters the identifier associated with the particular off-site piping line, the representation of that line is displayed in display window 141, as shown in FIG. 3. The representation includes the location of piping objects and connections and associated facility systems. In a separate window 143 on the display area 140, the following information relating to the line is displaced: (i) line number; (ii) line description; (iii) diameter; (iv) line owner or operator (which may also include relevant contact information); and (v) relevant cut sheets identifiers. A highlighted line 11 is illustrated in FIG. 13. If the user knows the approximate location of the leak, the user can place an electronic marker at the approximate location of the leak, as shown in FIG. 13. The system 100 then determines which valves 41 must be operated in order to isolate the leak. The necessary valves and the portion of the impact line are highlighted on the display 141, as shown in FIG. 14, such that the user can notify the necessary facility personnel of the appropriate leak isolation measures. The facility personnel would then manually close the valves to isolate the leak. It is also contemplated that electronic controls can be provided and linked to the system 100 such that the system operator can automatically operate the necessary valves. Such an arrangement would be useful when the necessary valve or valves are located within the safety zone.

The system 100 is interactive. As such, as the facility personnel notify the user of closure of a valve, the representation can be updated to change the status of the valve from an open position to a closed position. This can be used to direct the closure of values in a systematic, less time consuming manner. In some circumstances, a valve may fail or it is located within a safety zone such that facility personnel can not obtain access to the valve. It is then necessary to identify secondary valves, which are necessary to isolate the leak. The user can change the status of the valve to indicate either a failure or its location within the safety perimeter. As shown in FIG. 13, the user can then select using search window 142 that secondary valves be displayed. It is also possible to identify tertiary valves. The representation is then refreshed to illustrate the secondary valves to be closed to isolate the leak. Since the secondary or back-up valve is in another location remote from the primary valve, additional operating units, etc may be impacted by the shut-off. To differentiate the primary valves from the secondary valves, the valves may be displayed in different colors or other suitable identifier to distinguish primary and secondary valves. The display may also highlight those units impacted by the isolation procedure such that appropriate measures can be taken to divert supply from one line to another to maintain continuous operation of an operating unit or the appropriate shut down measures can be taken to avoid failure of an operating unit or to minimize damage to other piping objects within the particular off-site piping lines or adjacent piping lines.

Figure 9:
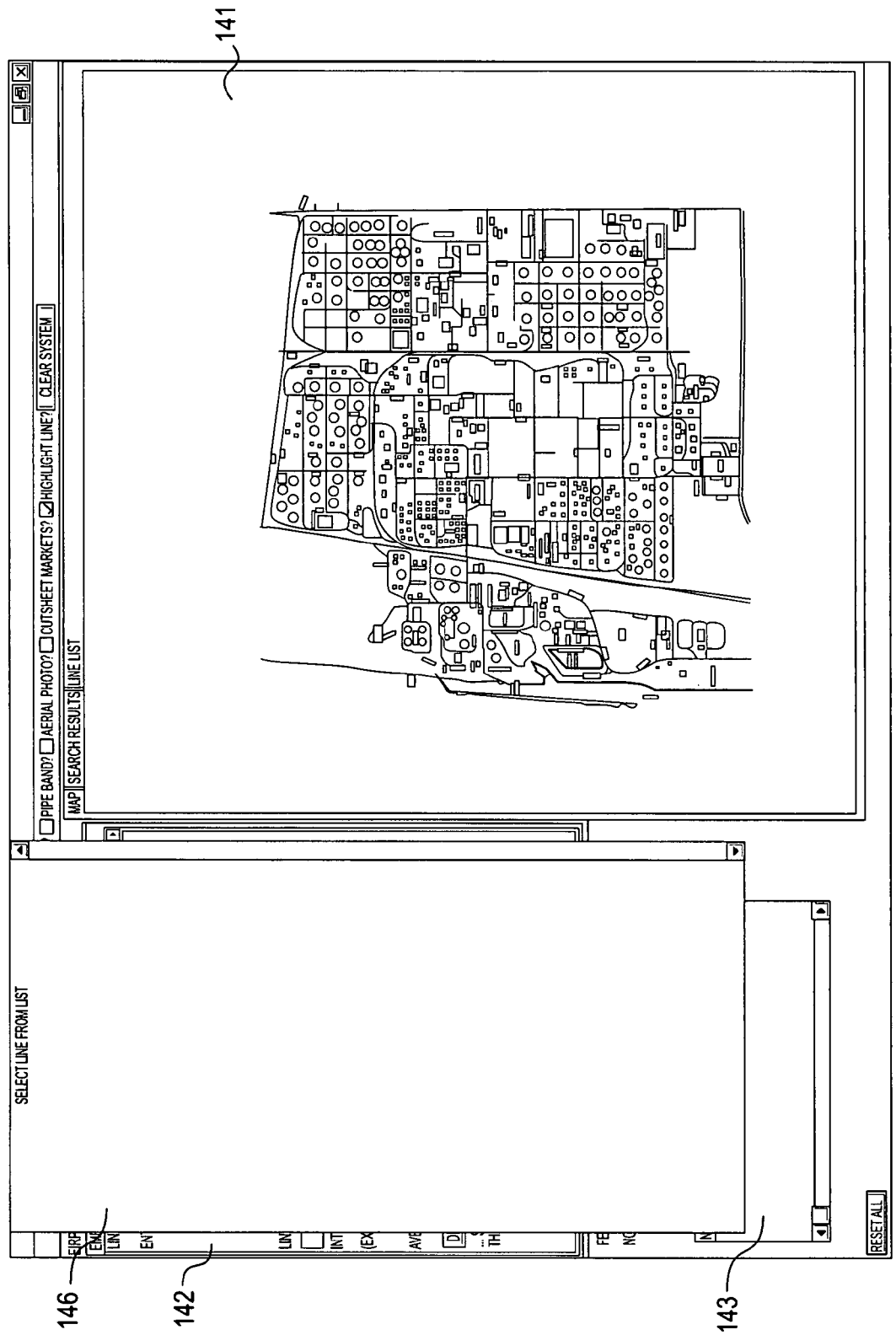
FIG. 9 is an illustration of the emergency isolation and response system of a menu for selecting off-site piping line based upon line information.

A search utilizing an off-site piping line description will now be described. The facility personnel may not know the particular line identifier, but may know the discrete substance flowing there through or the line name. The user using a pull down screen 146 may obtain a list of line numbers with a description of the line, the distinct substance flowing therethrough, etc. The pull down screen 146 is illustrated in FIG. 9. For purposes of illustration the specific line identifier information has been omitted from the window 146. In operation, the user can highlight the desired line identifier to display the corresponding representation in window 141. The user could also perform a search based upon the substance to provide a listing of potential off-site pipe lines. Based upon the information, the user can quickly isolate and identify certain off-site piping lines, which fit the descriptions provided by the facility personnel. From the listing, the user can retrieve the representations for display in the primary display window 141. As described above, the representation includes the location of all valves, diverters, connections and other piping objects. In a separate window 143 on the display area, the following information relating to the line is displaced: (i) line number; (ii) line description; (iii) diameter; (iv) line owner or operator; (v) relevant cut sheets identifiers; and (vi) other connected systems. If the user knows the approximate location of the leak, the user can highlight the particular area to produce an enlarged view. The leak can then be contained in the manner described above.

A search utilizing a cut sheet identifier will now be described. The facility personnel may provide the user with the unique identifier associated with a particular cut sheet. The user can then search for the cut sheet whereby the particular cut sheet is displayed, a shown in FIG. 5. From the cut sheet, the user can identify the identifier of the particular off-site piping line. The user may either highlight the desired cross section of the piping line on the cut sheet or enter the line identifier to highlight a particular piping line, as shown in FIG. 6. The user can then retrieve the necessary representation illustrating a particular off-site piping line. The user can then notify the facility personnel of the appropriate measures and steps necessary to isolate the leak.

Figure 10:
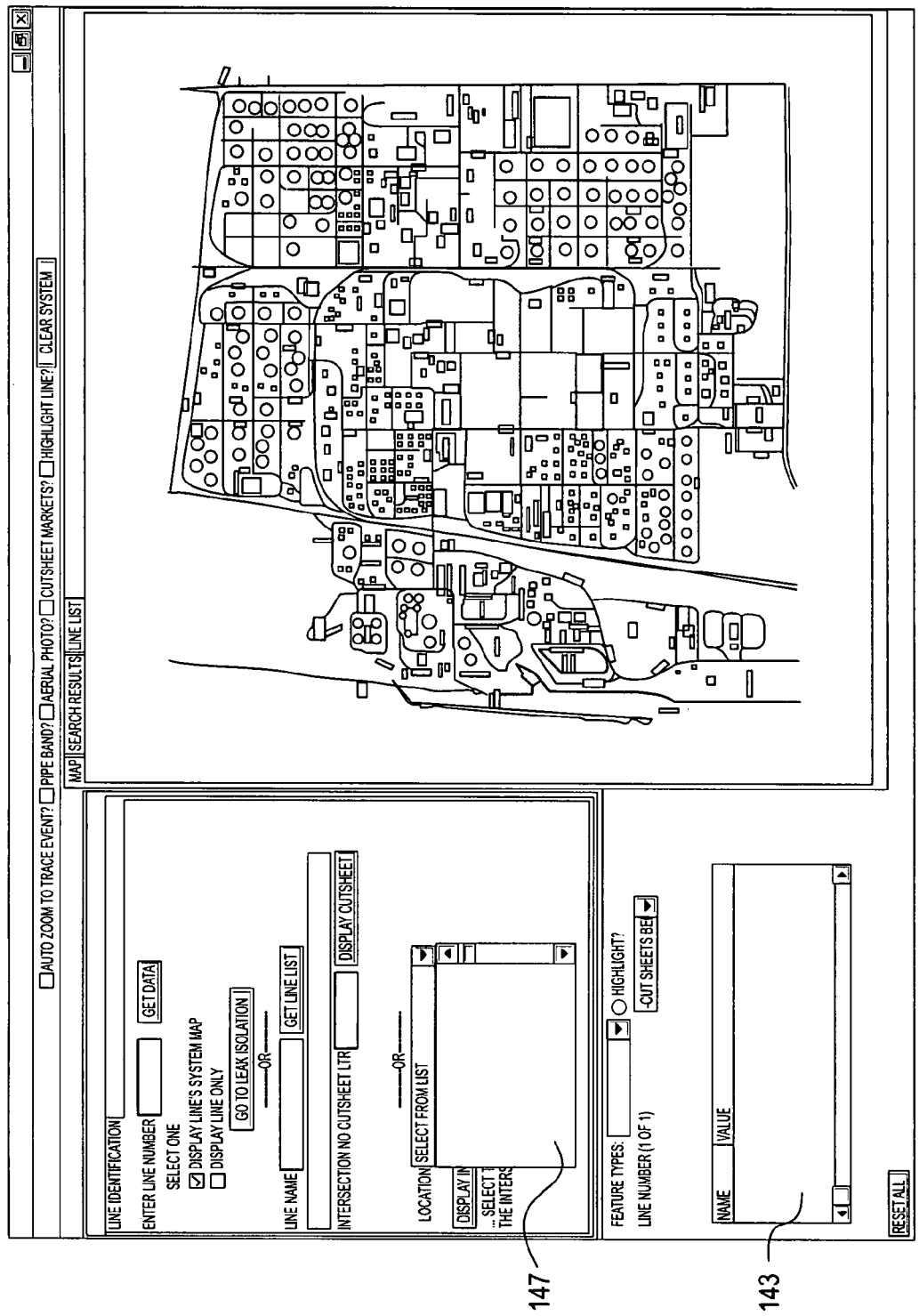
FIG. 10 is an illustration of the emergency isolation and response system of a menu for selecting off-site piping line based upon facility intersection information.
Figure 11:
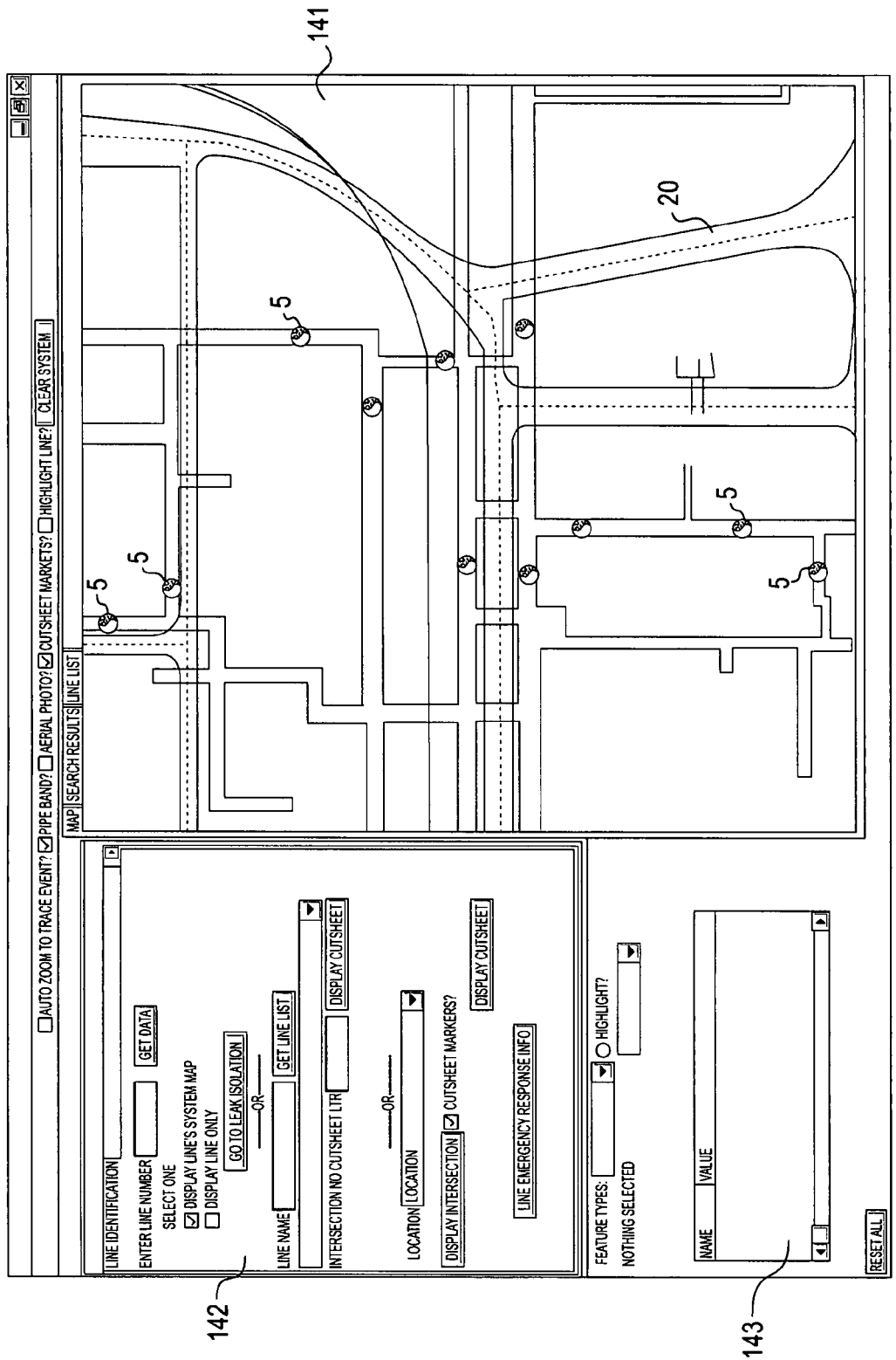
FIG. 11 is an illustration of the emergency isolation and response system for the intersection selected using the menu in FIG. 10 having cut sheet locations and off-site piping lines highlighted.
Figure 12:
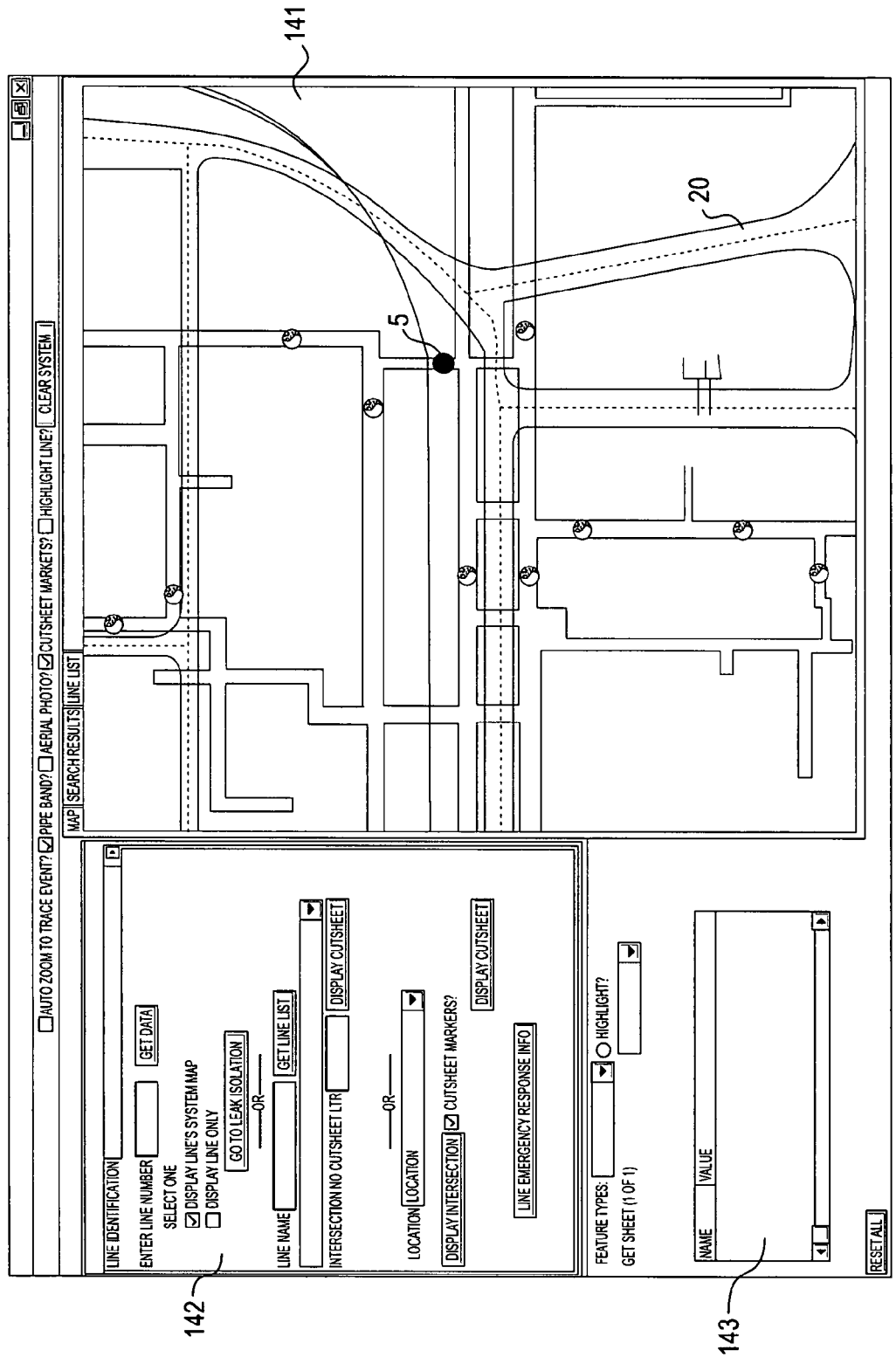
FIG. 12 is another illustration of FIG. 12 having a particular cut sheet location highlighted.

A search utilizing a street or intersection identifier will now be described. A situation may arise when the facility personnel calling in an emergency event is not familiar with the particular pipeband or the lines contained therein. The facility personnel may provide the user with only the street name or the intersection identifier or other geographic identifier such as adjacent operating units. Geographic identifiers can also be used in the event a member of the surrounding community calls in an event to the facility. The user can then search for the street and/or intersection and/or operating from a pull down menu 147 in search window 142. The pull down menu 147 is illustrated in FIG. 10. For purposes of illustration the specific location identifier information has been omitted from the menu 147. In operation, the user can highlight the desired line identifier to display the corresponding representation in window 141. Upon selection of a particular intersection, for example, a representation of the intersection is displayed, as shown in FIG. 7. The representation identifies the location of the nearest cut sheets 5, as shown in FIG. 11 and 12. The user can then identify the particular pipeband. Upon identifying the particular pipeband, the user can then identify the relevant cut sheet 5. The user can then either select the cut sheet marker displayed (by highlighting or clicking on the marker, as shown in FIG. 6) or enter the appropriate identifier associated with the cut sheet in the search window 142 to then display the necessary cut sheet. Once the appropriate off-site piping line is identified on the cut sheet, as shown in FIG. 6, the user can either highlight the particular line, as shown in FIG. 6, or enter the identifier corresponding to the line in the search window 142 to then display the appropriate line display. The line representation can then be displayed, as shown in FIG. 13. The user can then notify the facility personnel of the appropriate measures and steps necessary to isolate the leak.

Figure 16:
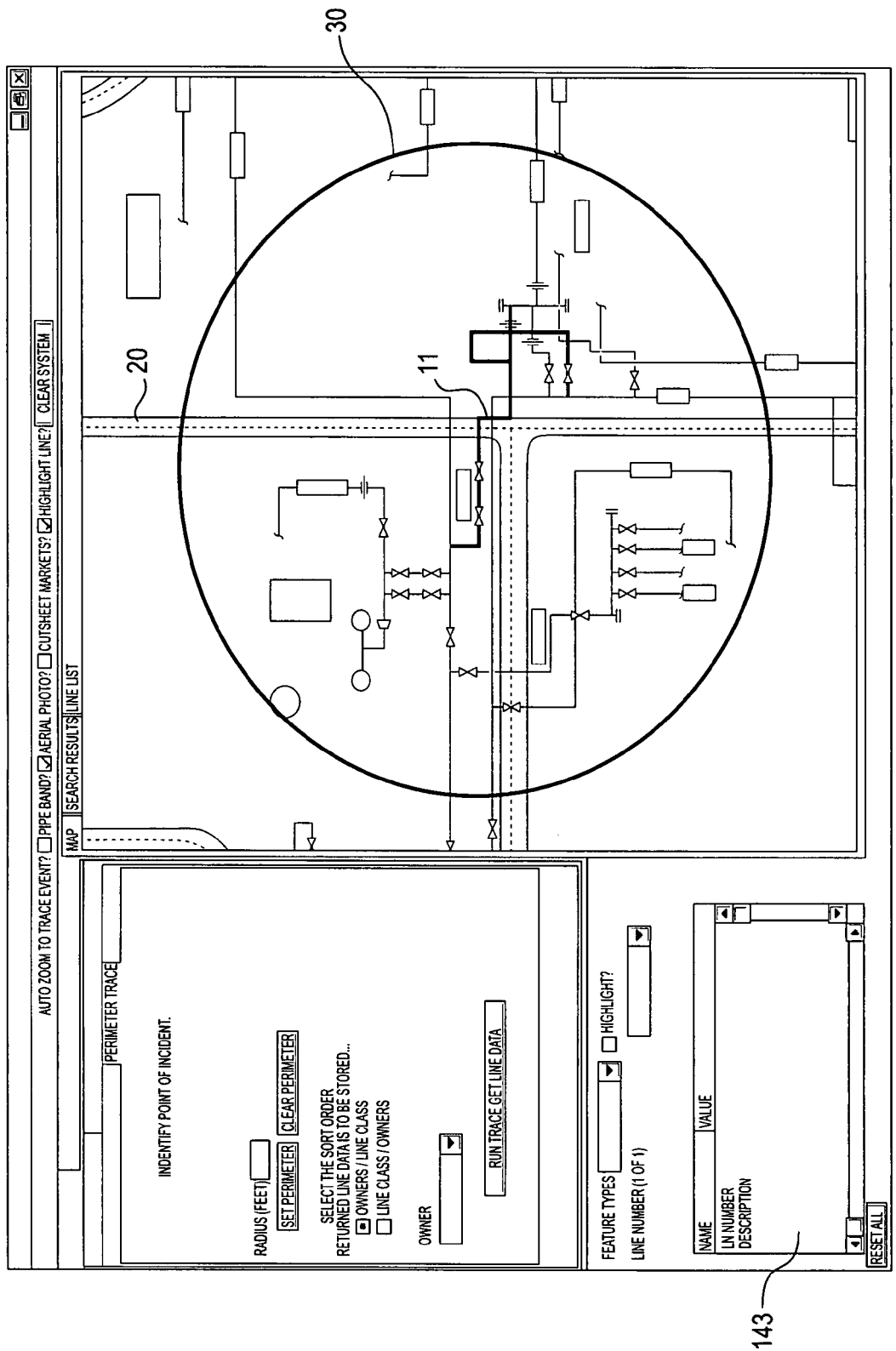
FIG. 16 is an illustration depicting the enlargement of a perimeter search.

The emergency isolation and response system 100 in accordance with the present invention may also be used to highlight an area within a particular perimeter, as shown in FIGS. 1 and 16. For example, in response to the occurrence of an emergency event (e.g., spill, fire, explosion, toxic event) within the facility it may be necessary to identify those off-site piping lines located within a safety perimeter. The user can retrieve an aerial image, as shown in FIG. 1, or large scale representation of the facility to pinpoint the approximate location of the event. The user can either draw a trace 30 or enter the approximate radius of the security perimeter, as shown in FIG. 1. The user can then retrieve an image, which enlarges the traced area, as shown in FIG. 16. The enlarged representation then identifies the off-site piping lines, the piping objects, operating units and other identifiers contained within the perimeter. The user can then retrieve representations of the off-site piping lines to determine which if any of the lines and the operating units, etc. connected thereto are impacted. The user can then retrieve the necessary piping object information, etc such that the impact of the emergency event can be limited to the area within the safety perimeter. This is very effective to minimize the potential catastrophic impact of an emergency event. The system can also be used to identify the necessary size of a safety perimeter. Unfortunately, explosions, fires and the release of flammable or toxic gases from operating units do occur. When this does occur, it may be necessary to evacuate persons from buildings within the facility the community surrounding the facility. While other methods are available for estimating the spread of such releases throughout the facility and beyond the facility perimeter, the results of such estimated can be integrated with the system 100 and the extent displayed on the facility representation, as shown, for example, in FIG. 1. By expanding the aerial images to the surround community, it is possible to identify the scope of any mandatory evacuation. As discussed above, the system 100 may be linked to other systems. It is possible to link the system 100 to an alarm system such that alarms may sound within the safety perimeter to notify facility personnel to leave the area. The safety perimeter may also be used to establish a safety perimeter for maintenance and other non-emergency events. For example, a crane may be used to lift refinery components over pipe bands and other components within the facility. The height of the crane can be used to establish a safety perimeter in the event that the crane topples.

Figure 17:
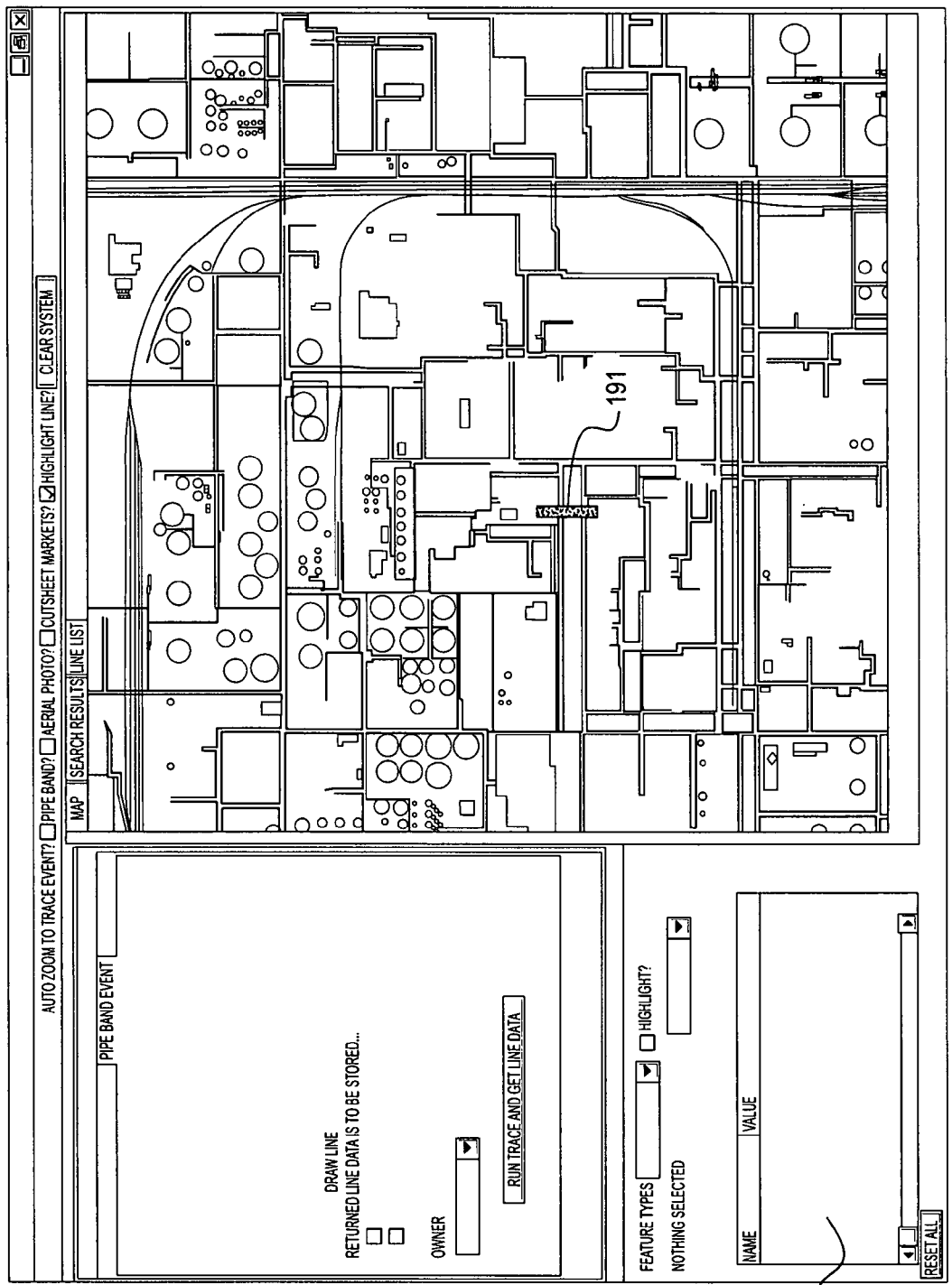
FIG. 17 is an illustration depicting a search performed using the system of the present invention to identify a pipeband.
Figure 18:
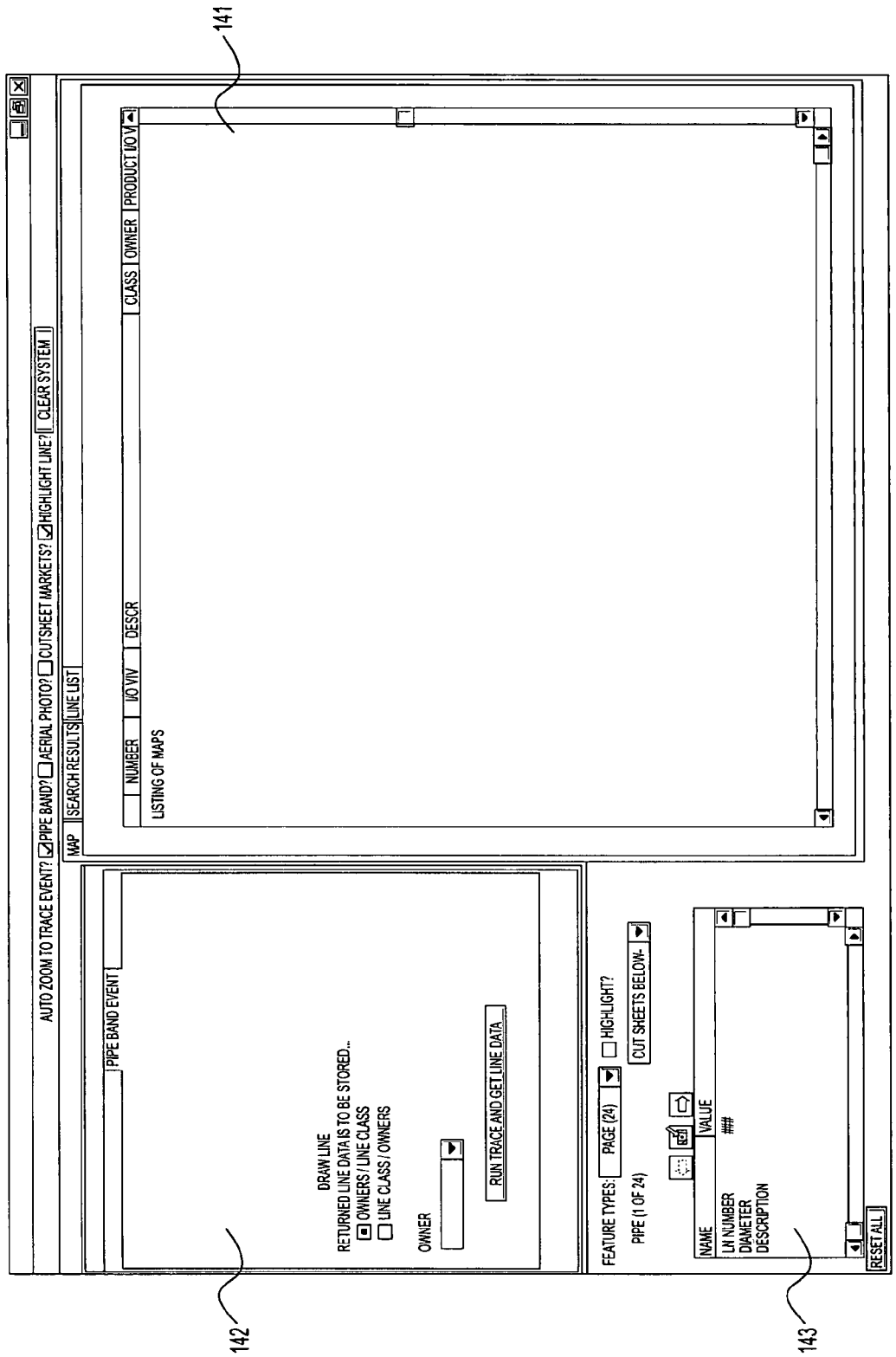
FIG. 18 is an illustration depicting the information retrieved from the search performed in FIG. 17.

The system 100 can also be used to identify all off-site piping lines, which extend through a pipeband. The user can identify a particular pipeband by identifying two points (which create a cross sectional line 191) over a pipeband, as shown in FIG. 17. The system 100 then searches and identifies all off-site piping lines passing through the pipeband at that location. The relevant information relating to each of the off-site piping lines is then displayed in a list, as shown for example in FIG. 18, which for purposes of illustration displays the window, but not the specific contents. The actual display window would display sufficient information such that the user can readily identify and select the necessary piping lines. The displayed information includes links, which permit the user to then quickly locate representations and cut sheets associated with the individual off-site piping lines contained within the pipeband. This functionality is especially useful when an event occurs that may impact an entire pipeband. As such, all of the affected lines within the pipe band can be identified such that sufficient isolation steps can be performed for each line to isolate the event.

It is also contemplated that the system 100 may be linked to an automated leak detection system, which could detect pressure drops and other parameters indicative of leaks. The system 100 can then be used to pinpoint the leak and identify the necessary steps (e.g., valve closures) needed to isolate the event.

While the primary objective of the emergency isolation and response system is directed to improving response times in emergency events, the system 100 is useful other purposes, which are considered to be well within the scope of the present invention. The system 100 can be used as a training module for facility personnel in connection to with emergency response planning and preparation. The system 100 can be used to simulate the occurrence of an emergency event to facilitate preparedness of both facility personnel and those in the surrounding community.

It is also contemplated that the system 100 can be used in connection with planning. As a planning tool, the system 100 can be used to identify (i) unused off-site piping lines, (ii) which lines and operating units are impacted by maintenance procedures, (iii) lines and operating units that are impacted when components are lifted over a pipeband, (iv) possible locations of new off-site piping lines, (v) managing the inspection of off-site piping systems, and (vi) managing the maintenance of off-site piping systems.

The present invention, however, is not intended to be limited to just off-site piping; rather, it is contemplated that the system 100 can be used in connection with processing units to track and isolate events in processing units. It is also contemplated that usage of the system 100 will be stored in memory in the computer control unit 110 such that certain information can be later retrieved, if necessary. In particular, date, time and user accessing the representation is stored including copies of the representation and any changes made (i.e., the actuation of valves) in response to an event or use of the system 100.

It will be apparent to those skilled in the art that various modifications and/or variations may be made without departing from the scope of the present invention. It is intended that all matter contained in the accompanying specification shall be interpreted as illustrative only and not in a limiting sense. While the present invention has been described in the context of a refinery and/or petrochemical facility, the present invention is not intended to be so limited; rather it is contemplated that the present invention is suitable for use in other facilities having extending lines of piping for transporting materials throughout a facility. Thus, it is intended that the present invention covers the modifications and variations of the method and system disclosed herein, provided the modifications and variation come within the scope of the appended claims and their equivalents.

What is claimed is:

1. A method for mapping a facility having at least one facility unit and a piping system, wherein the piping system includes at least one pipeband extending through at least a portion of the facility, each pipeband contains at least one piping line through which a designated substance flows there through and at least one piping line device associated therewith, comprising:

locating and identifying select land based identifiers within the facility and assigning a unique intersection identifier for each of the select land based identifiers and providing descriptive information for each of the select land based identifiers, wherein each of the select land based identifiers being located in the vicinity of one of the at least one facility unit and a piping system;

locating and identifying at least one location for at least one cut sheet in the vicinity of at least one of the select land based identifiers and assigning a unique cut sheet identifier for each location of a cut sheet, wherein each cut sheet is located adjacent to the piping system and identifies each piping line at the location of the cut sheet;

mapping each of the least one cut sheet to identify each piping line within the pipeband at the location of the particular cut sheet, wherein the mapping of each cut sheet includes identifying each piping line at the location of the particular cut sheet and location within the pipeband; and mapping each of the at least one piping line, wherein mapping each piping line includes (i) assigning a unique piping line identifier for the piping line, (ii) providing descriptive information for the piping line, (iii) identifying each piping line device associated with the piping line, (iv) providing description information for each piping line device, (v) mapping the location of each piping line device associated with the piping line, (vi) providing a unique descriptive identifier for each piping device, and (vii) mapping at least one of the location of each cut sheet location on each piping line and the location of each piping line on each cut sheet location.

2. The method of mapping according to claim 1, further comprising:

obtaining at least one image of the facility, wherein the at least one image identifies approximate locations of the at least one off-site pipeband, the at least one facility unit, and the at least one land based identifier.

3. The method of mapping according to claim 1, wherein the piping line is one of off-site piping line and on-site piping line.

4. The method of mapping according to claim 1, wherein the at least one piping line device comprising at least one of a valve, piping object, sensor, and monitoring device.

5. The method of mapping according to claim 1, wherein the mapping of each of the at least one cut sheet includes preparing an electronic representation of each cut sheet.

6. The method of mapping according to claim 5, wherein the mapping of each of the at least one piping line includes preparing an electronic representation of each piping line.

7. The method of mapping according to claim 6, further comprising:

providing at least one electronic link between each piping line represented on a particular cut sheet and the electronic representation corresponding to such piping line.

8. The method of mapping according to claim 1, wherein the mapping each cut sheet includes providing a directional indicator orienting the cut sheet with respect to at least one select land based identifier.

9. The method of mapping according to claim 1, providing descriptive information for the piping line includes providing the diameter of the piping line.

10. The method of mapping according to claim 1, wherein the mapping each of the least one cut sheet to identify each piping line includes identifying the diameter of each piping line at the location of the particular cut sheet.

11. A system for emergency isolation and response to an event in a facility, wherein the facility includes a piping system having at least one pipeband extending across a portion of the facility, wherein each pipeband contains at least one piping line, wherein each piping line containing piping through which a substance flows therethough and at least one piping line device, wherein the facility includes at least one facility unit, comprising:

a searchable database containing at least one representation of each piping line, and at least one cut sheet for each of the at least one pipeband, wherein each cut sheet illustrating the at least one piping line extending through the pipeband at the particular location of the cut sheet in the facility and the location of the piping line with respect to other piping lines within the pipeband at the particular location of the cut sheet, wherein each representation of a piping line is electronically linked to the each cut sheet in which such piping line appears, wherein each cut sheet is electronically linked to each representation of a piping line within the pipeband at the particular location of the cut sheet;

a computer operating unit for storing the searchable database and retrieving representations and cut sheets;

at least one terminal for accessing and displaying representations and cut sheets retrieved by the computer operating unit.

12. The system according to claim 11, wherein each of the at least one piping line is one of an off-site piping line and an on-site piping line.

13. The system according to claim 11, further comprising:

at least one representation of a cut sheet, wherein the at least one representation of the cut sheet is displayed at the particular location of the cut sheet in the facility.

* * * * *